(12) United States Patent
Roush

(10) Patent No.: US 7,914,034 B2
(45) Date of Patent: Mar. 29, 2011

(54) CARGO TUBE

(75) Inventor: Mark A Roush, Lafayette, IN (US)

(73) Assignee: Vanguard National Trailer Corp., Monon, IN (US)

( * ) Notice: Subject to any disclaimer, the term of this patent is extended or adjusted under 35 U.S.C. 154(b) by 305 days.

(21) Appl. No.: 12/121,994

(22) Filed: May 16, 2008

(65) Prior Publication Data

US 2008/0284131 A1 Nov. 20, 2008

Related U.S. Application Data

(60) Provisional application No. 60/930,926, filed on May 18, 2007.

(51) Int. Cl.
*B62B 1/00* (2006.01)
(52) U.S. Cl. ...... 280/656; 280/839; 280/838; 296/186.1
(58) Field of Classification Search ............ 280/656, 280/834, 837, 839, 830, 833; 296/186.1, 296/182.1, 191, 210; 52/270, 262, 265; 403/393, 403/231
See application file for complete search history.

(56) References Cited

U.S. PATENT DOCUMENTS

| | | | |
|---|---|---|---|
| 2,871,911 A | 2/1959 | Brandt | |
| 2,934,372 A * | 4/1960 | Jewell et al. | 296/186.1 |
| 2,990,091 A | 6/1961 | Brandt | |
| 3,556,888 A | 1/1971 | Goldsworthy | |
| 3,557,992 A | 1/1971 | Reeves | |
| 4,420,359 A | 12/1983 | Goldsworthy | |
| 5,026,447 A | 6/1991 | O'connor | |
| 5,041,318 A * | 8/1991 | Hulls | 296/181.3 |
| 5,225,020 A | 7/1993 | Millett | |
| 5,286,320 A | 2/1994 | Mcgrath | |
| 5,472,290 A * | 12/1995 | Hulls | 403/393 |
| 5,556,496 A | 9/1996 | Sumerak | |
| 5,730,485 A | 3/1998 | Sjostedt | |
| 5,882,460 A | 3/1999 | Durand | |
| 5,918,759 A | 7/1999 | Beckmann | |
| 5,928,735 A | 7/1999 | Padmanabhan | |
| 5,948,472 A | 9/1999 | Lawrie | |
| 6,095,715 A | 8/2000 | Hulls | |
| 6,158,773 A | 12/2000 | Verhaeghe | |
| 6,183,824 B1 | 2/2001 | Padmanabhan | |
| 6,558,608 B2 | 5/2003 | Haraldsson | |
| 6,565,976 B1 | 5/2003 | Qureshi | |
| 6,871,600 B2 | 3/2005 | Norton | |
| 7,028,382 B2 | 4/2006 | Fisher | |
| 7,056,976 B2 | 6/2006 | Joshi | |
| 7,378,000 B2 * | 5/2008 | Lemmons | 296/186.1 |
| 7,401,844 B2 * | 7/2008 | Lemmons | 296/186.1 |
| 2002/0014302 A1 | 2/2002 | Fanucci | |
| 2002/0148382 A1 | 10/2002 | Norton | |
| 2006/0070340 A1 | 4/2006 | Fanucci | |
| 2007/0023438 A1 | 2/2007 | Kenneth | |

* cited by examiner

*Primary Examiner* — Hau V Phan
(74) *Attorney, Agent, or Firm* — Dowell Baker, P.C.

(57) ABSTRACT

A tube shaped cargo container and method of manufacture. The cargo container is manufactured by a process that includes pultruding or extruding a seamless container with two sides, a roof, and a floor. Doors, landing gear, structural supports, another side, and a wheel assembly may be added after the pultrusion/extrusion process. The cargo container may include rounded side/floor and side/roof connections. The cargo container may include one or two rounded ends.

20 Claims, 20 Drawing Sheets

FIG. 11
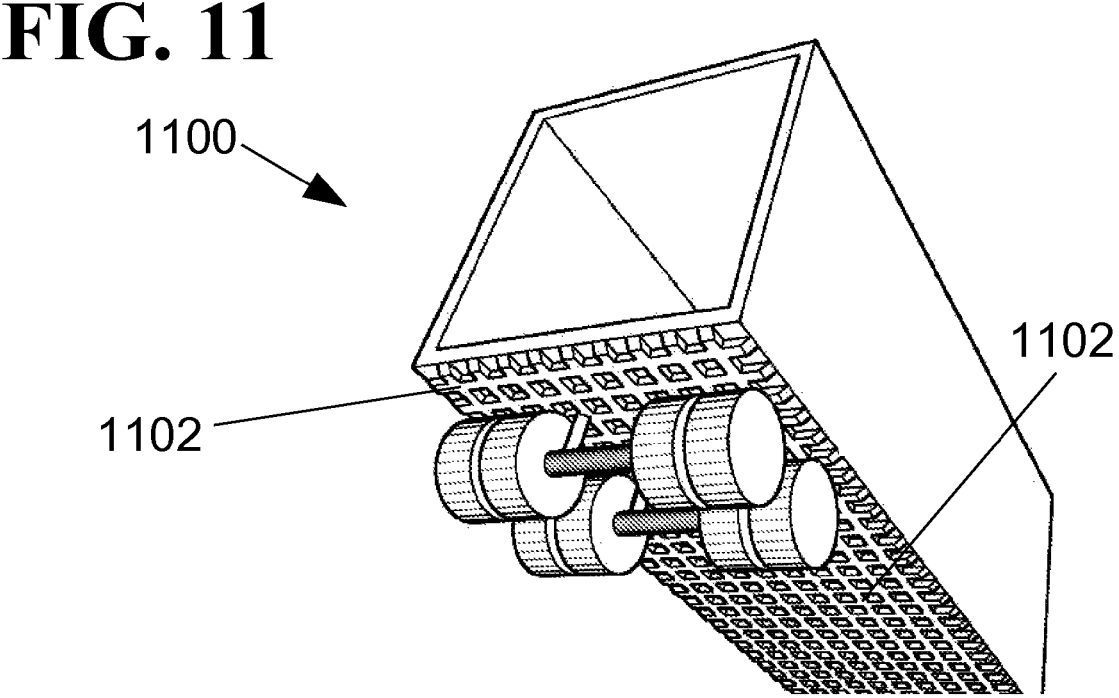
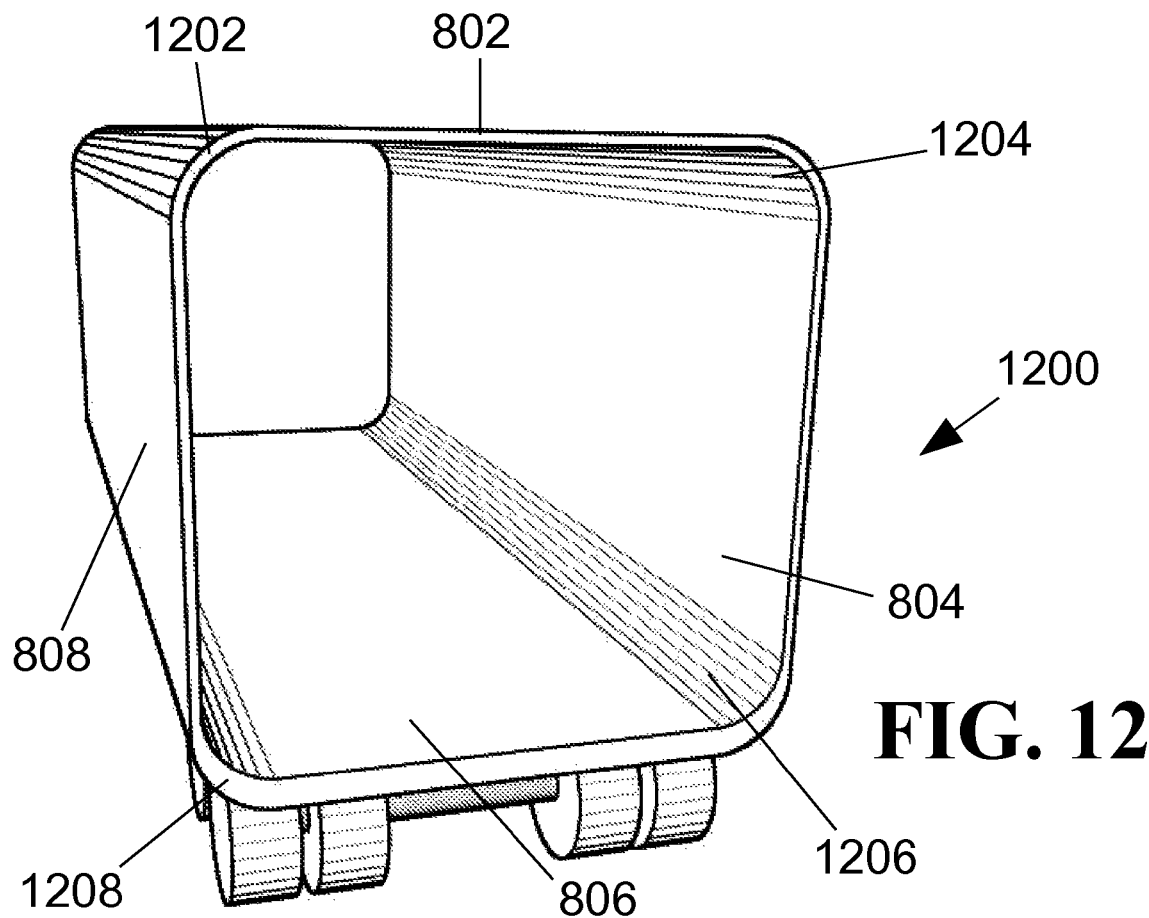
FIG. 12

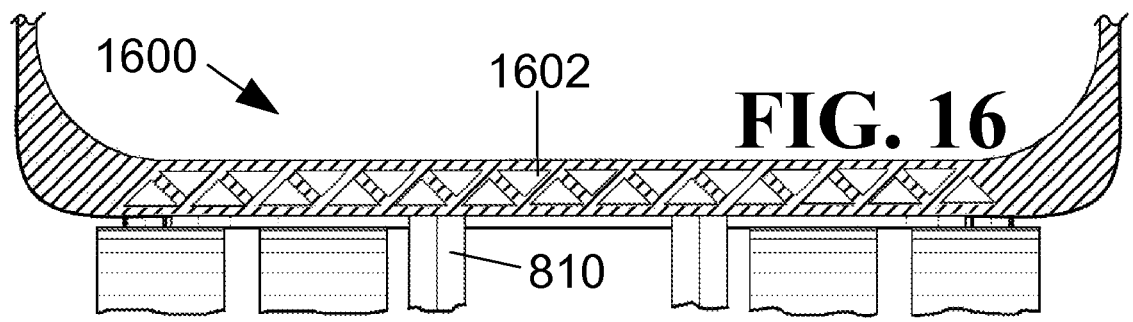
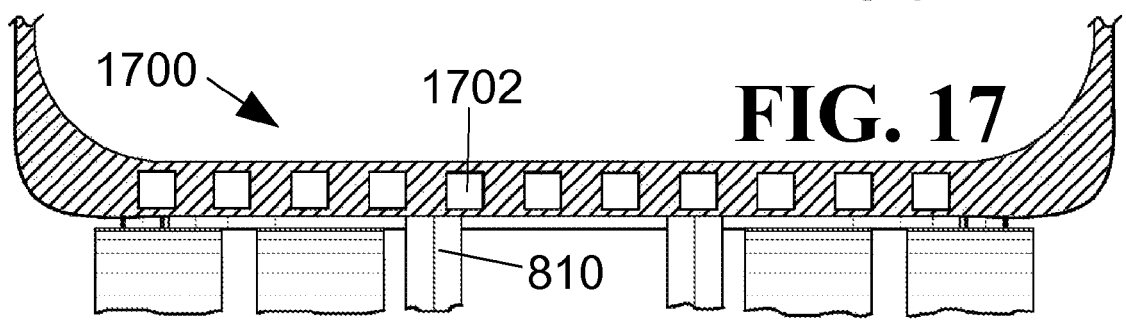
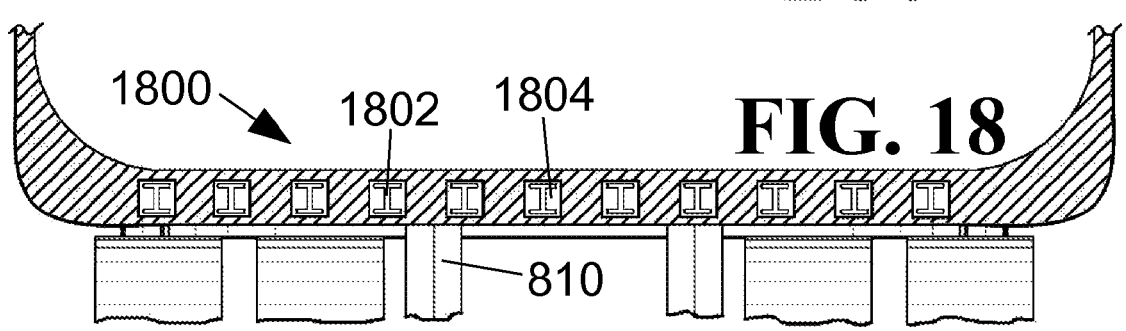
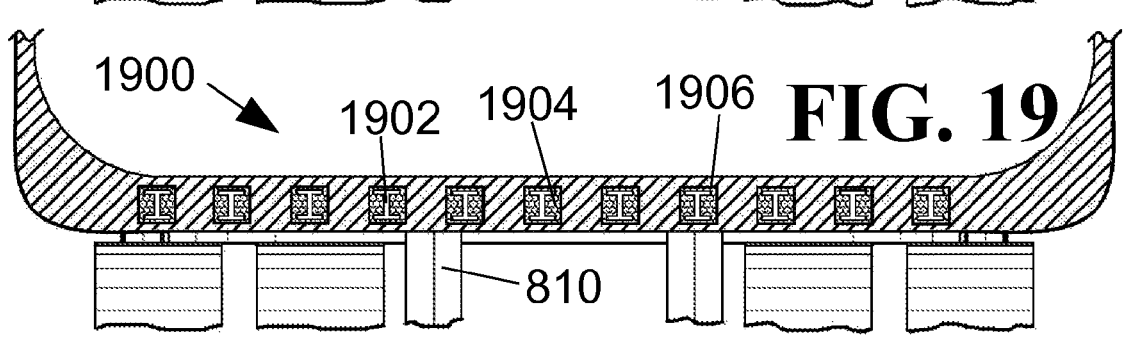
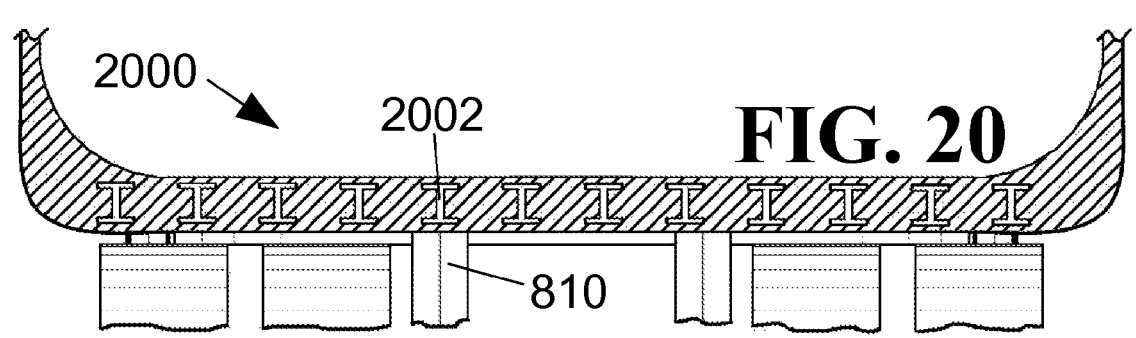

FIG. 26
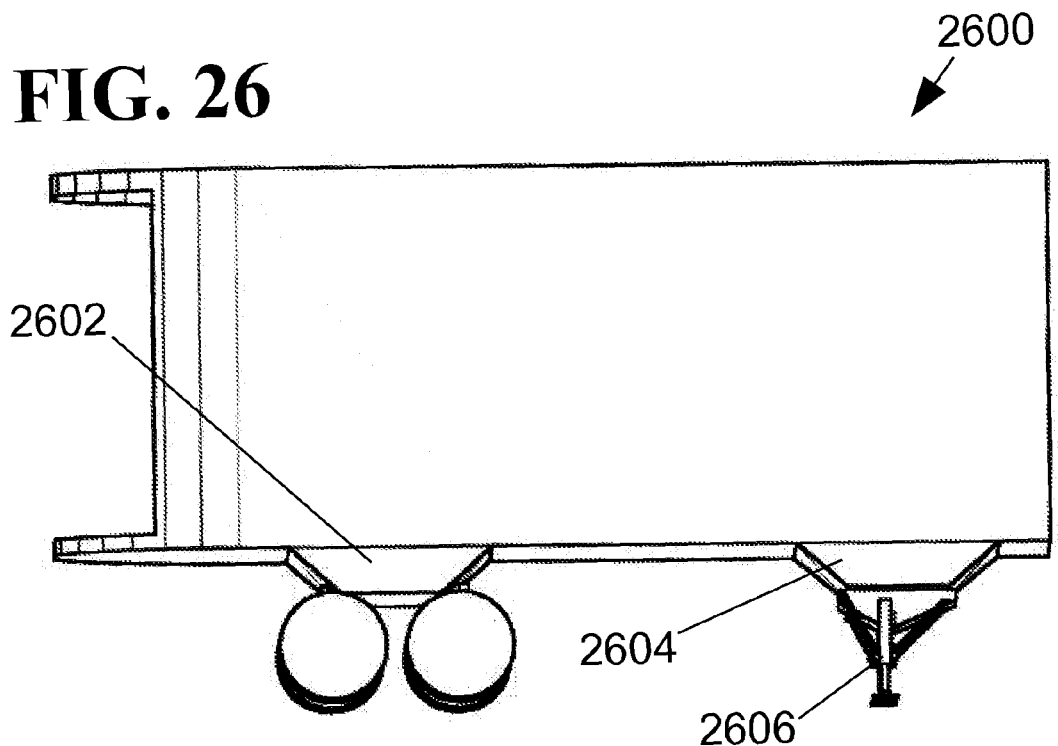
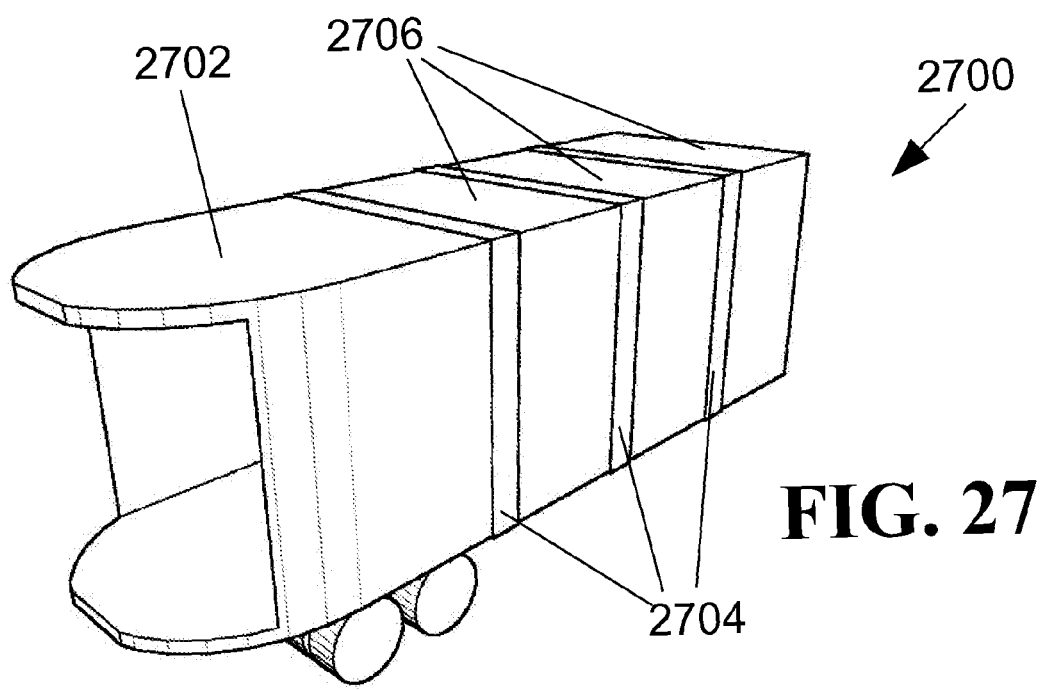
FIG. 27

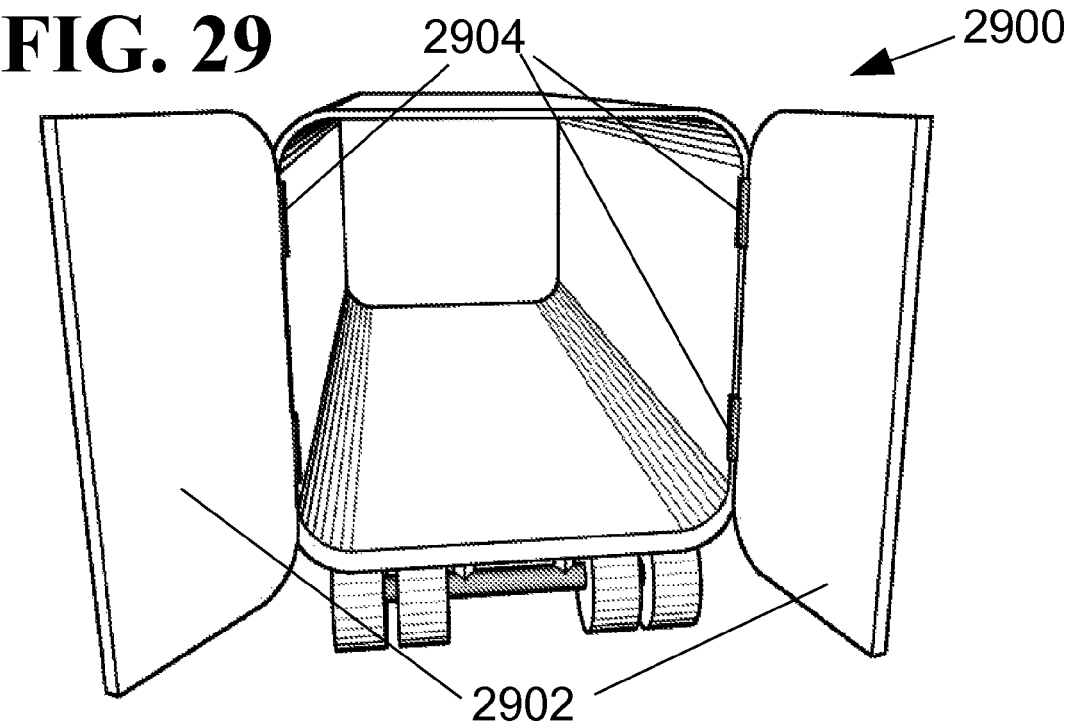
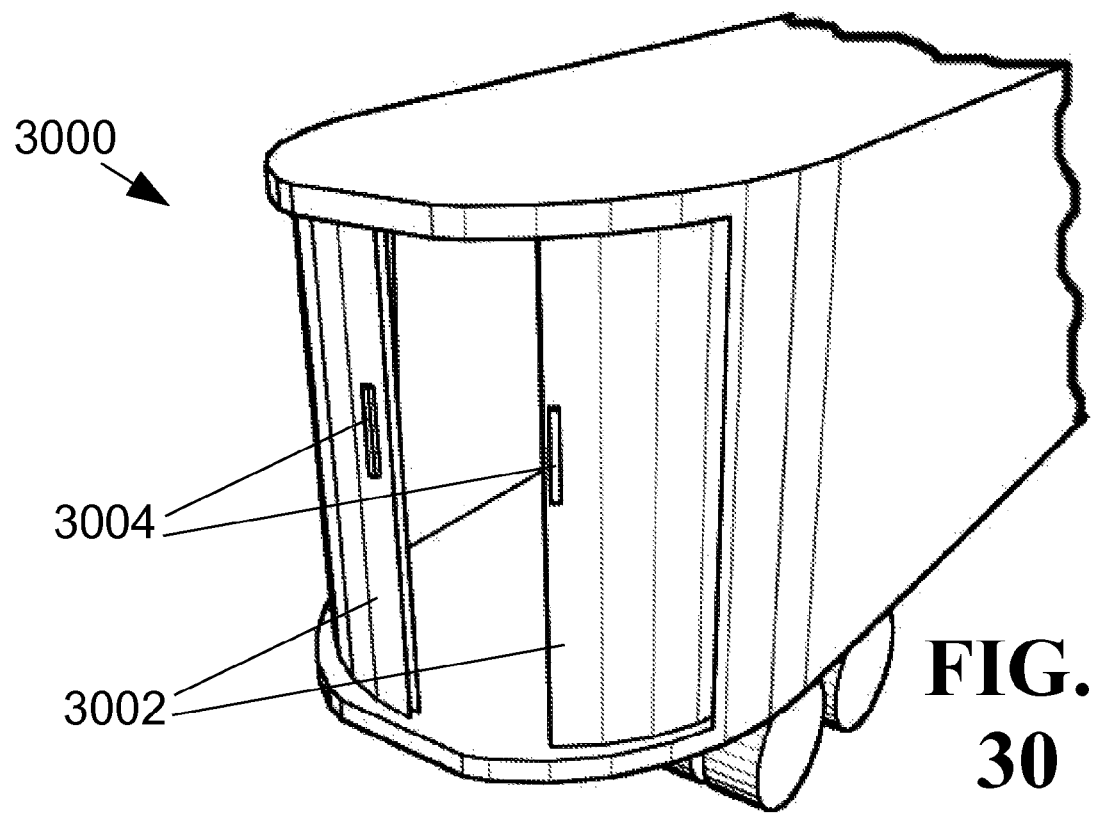

FIG. 31
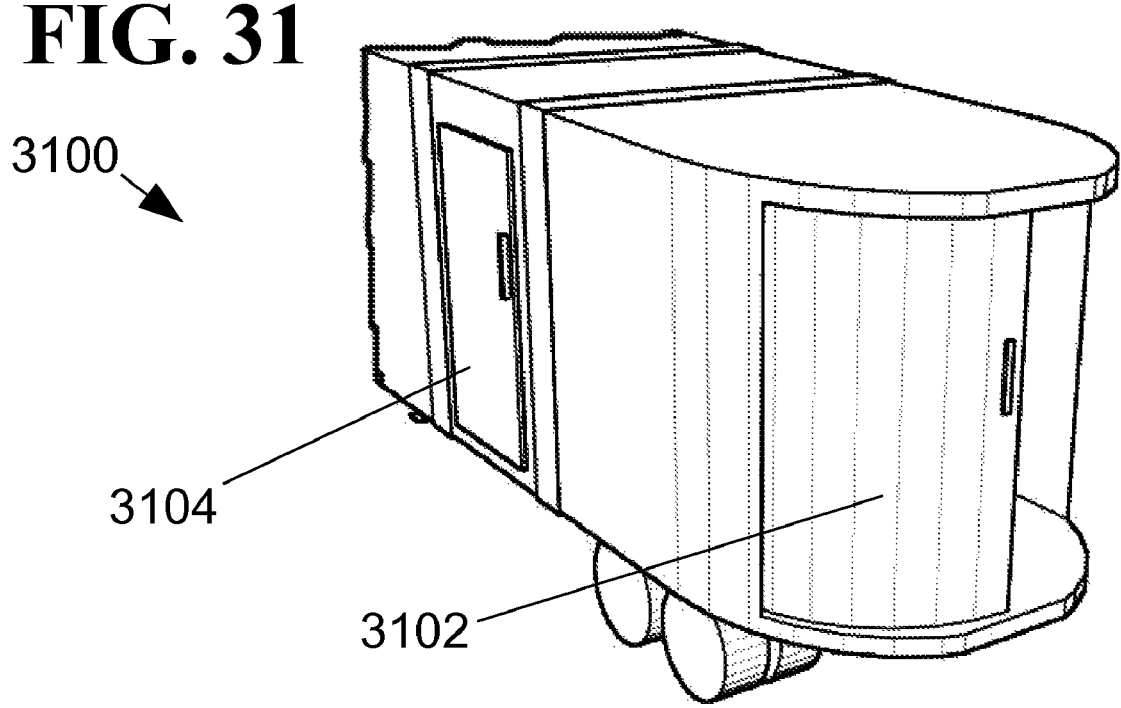
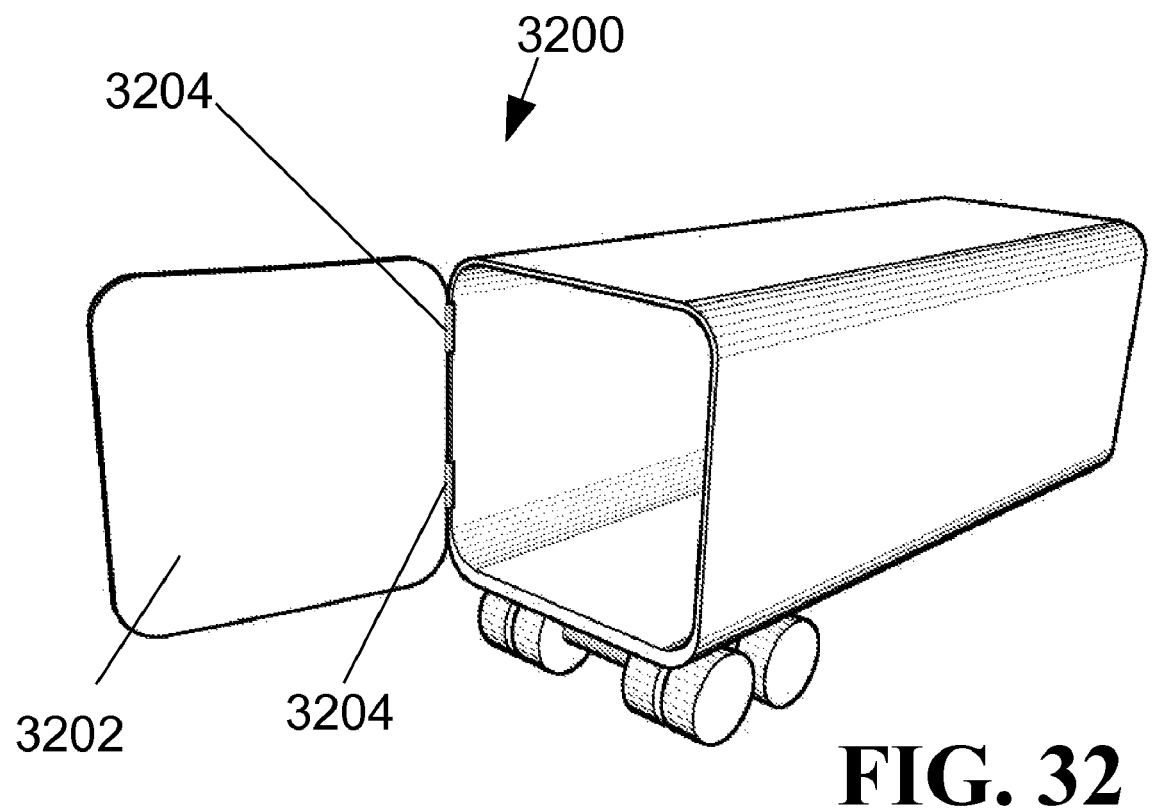
FIG. 32

CARGO TUBE

CROSS-REFERENCE TO RELATED APPLICATION

This application claims priority to provisional application Ser. No. 60/930,926, entitled "Cargo Tube" filed May 18, 2007 to Mark Roush, the contents of which are incorporated herein by reference.

FIELD OF THE INVENTION

This invention relates to cargo containers. More specifically, it relates to a cargo container with two sides, a top, and a bottom manufactured as a single pultruded or extruded unit.

BACKGROUND OF THE INVENTION

There are many types of cargo containers. Cargo containers have been designed to be loaded onto ocean going ships. Certain cargo containers have been specially shaped to fit into the curved hulls of airplanes. Cargo containers have also been specifically designed to be transported by train. Cargo containers are also often transported as trailers by trucks.

There are many challenges associated with cargo containers. One problem is that cargo containers are often made up of many different parts. Increased numbers of parts often add to the cost and manufacturing time of the cargo container. Thus it is desirable to have a cargo container with as little complexity as possible.

Another problem is that the mass of the container must be transported along with the cargo. Heavy containers require more energy and cost to be transported than light containers. Wind resistance further acts upon cargo containers in transit. A drag force acts on an object which moves in a fluid environment such as air or water. Drag forces on the trailer reduce the fuel efficiency of a truck pulling a cargo container, and increase the cost of transporting the cargo container. Smooth sided containers with rounded edges reduce air resistance and reduce transportation costs. Smooth sided containers also facilitate the application of decals and advertisements to the side of the container. It is desirable have a light and aerodynamic cargo container to reduce transportation costs.

Another problem is that cargo containers must be resilient enough to carry cargo without being significantly distorted and damaging the cargo. Cargo containers are subjected to strain and forces during loading, unloading, and transport. Thus it is desirable to have a cargo container that is as resilient as possible.

There have been attempts to solve some of these problems. For example, U.S. Pat. No. 3,557,992 that issued to Reeves teaches "a method and apparatus for molding insulated reinforced plastic structures for use as refrigerated cargo containers and truck or trailer bodies. The insulated reinforced plastic structures have substantially parallel opposed sides and are molded as a unitary structure in a single molding operation. Glass fiber reinforcing materials, which include an insulating core material, are placed in the bottom of a female mold and up against the sides. A somewhat loose fitting mandrel braced vertically but which may be later be expanded laterally, is lowered down in between the materials at the side and on top of materials at the bottom. Further glass fiber reinforcing materials, including a core material are placed on top of the mandrel. A male mold is lowered in place on top of these materials but somewhat short of full final closing. A free flowing liquid plastic resin is pumped within the space defined by the make and female molds and the mandrel. The free flowing liquid plastic resin impregnates the glass fiber reinforcing and wets the surfaces of the core material. The male mold is closed fully downward and the mandrel expanded fully laterally, compressing the glass fiber reinforcing and compacting the entire material assembly in its final form. The liquid plastic resin then hardens, the molds are opened, and the molding is removed from the mold."

For example, U.S. Pat. No. 5,026,447 that issued to O'Connor teaches "an article of manufacture comprising a pultruded thermoplastic composite body having at least two integral sections of different cross-sectional shapes. This is produced by a method and/or in an apparatus wherein an elongated body of reinforced thermoplastic material is pulled through a plurality of dies and the plurality of dies are operated independently of each other so that any combination of the dies can be selected to operate on the elongated body for imparting to at least a portion of the body the cross-sectional shape of the selected one or ones of the dies."

U.S. Pat. No. 5,286,320 that issued to McGrath teaches "a method for continuously manufacturing a composite sandwich structure by pultrusion through a pultrusion die comprises arranging fiber reinforcement materials on the surface of a preformed foam core, applying liquid resin to the reinforcement materials on the surface of the foam core, heating the surface region of the foam core to a temperature of at least 100° C. to convert water in the foam core to steam, thereby causing water vapor pressure expansion of the foam, and using the expansion of the foam core to subject the liquid resin to increased pressure."

U.S. Pat. No. 5,556,496 that issued to Sumerak teaches "a method for producing a pultrusion product having a variable cross-section using a specially adapted temperature controllable pultrusion die includes the steps of pulling reinforcing fibers which have been impregnated with a heat curable thermosetting polymeric resin composition through a temperature controllable die, heating the temperature controllable die to a temperature sufficient to effect curing of the thermosetting resin, cooling the temperature controllable die to a temperature which is sufficiently low to prevent any significant curing of thermosetting resin passing through the pultrusion die, pulling the cured material and a predetermined length of uncured material from the die, reshaping the uncured material, and curing the reshaped material. The reshaping step can be used to provide off-sets, flanges, bosses and the like. The method and associated apparatus of the invention provide a relatively simple and inexpensive way of producing fiber-reinforced thermoset plastics having a variable cross-section selected intervals along the length of the article."

U.S. Pat. No. 6,558,608 that issued to Haraldsson teaches "a method of constructing large, unitary, fiber-reinforced Polymer composite containers using a vacuum assisted resin transfer molding process. The method allows for the construction of container systems with only two separately molded parts—an open box consisting of a base (i.e., floor), 2 sidewalls and 2 endwalls, and a cover (i.e., roof). The method results in a structure which maintains the continuity of the reinforcement fibers across the junction between the floor, side, and end walls corners. This method can be applied to very large composite structures such as railcar bodies, intermodal containers, and shelters."

U.S. Pat. No. 6,565,976 that issued to Qureshi teaches "a pultrusion resin composition comprising about 75 wt % to about 85 wt % of a phenolic resin, about 9 wt % to about 20 wt % of the reaction product of a polyhydroxy compound and an epoxy-functional polysiloxane, about 6 wt % to about 15 wt %, of a phenolic epoxy, and about 0.2 wt % to about 1 wt % of a catalyst, based on total weight of the composition.

Pultruded products are formed by drawing fibrous reinforcement through a bath of the pultrusion resin composition."

U.S. Pat. App. Pub. No. 20020014302 by Fanucci teaches "a pultrusion method produces a composite structural member having rigid elements embedded therein. The structural member may be a sandwich structure in which one or more rigid, pre-rigidized, or rigidizable composite or non-composite structural elements are introduced at regular or irregular positions within core elements. The structural member may also be formed from layers of resin-matrix fiber fabric into a structural cross-section, such as an I-beam or T-beam, with a bundle of pre-pultruded rods located at the bends or the web-flange intersection points within layers."

SUMMARY OF THE INVENTION

In accordance with preferred embodiments of the present invention, some of the problems associated with cargo containers are overcome. A light weight cargo container with pultruded or extruded components is presented.

The cargo container includes a single seamless and jointless cargo tube with a top roof, a bottom floor, and two significantly parallel sides. The cargo container may further include a strut, connected to the cargo tube, an axel connected to the strut, and a plurality of wheels connected to the axel. The cargo container may include doors with hinges and/or doors that slide. The cargo container may include landing gear for supporting the container when the container is not being transported by a tractor. The cargo container may further include a bottom floor with greater thickness than each of the significantly parallel sides, or a bottom floor with parallel or interconnected support protrusions. The cargo container may include a cargo tube with edges that are significantly rounded, support structures in the significantly rounded edge sections of the cargo tube, rounded end sections, and a plurality of non-end sections and interconnects.

The foregoing and other features and advantages of preferred embodiments of the present invention will be more readily apparent from the following detailed description. The detailed description proceeds with references to the accompanying drawings.

BRIEF DESCRIPTION OF THE DRAWINGS

Preferred embodiments of the present invention are described with reference to the following drawings, wherein:

FIG. 1 is a schematic view of a continuous manufacturing process for pultruded cargo containers and the like;

FIG. 2 is a schematic view of another continuous manufacturing process for pultruded cargo containers and the like;

FIG. 11 is a perspective view of a cargo container that comprises a cargo tube and a wheel assembly, where the floor of the cargo tube includes cross hatch protrusions;

FIG. 12 is a perspective view of a cargo container that comprises a cargo tube and a wheel assembly, where the edges of the cargo tube are significantly rounded;

FIG. 16 is a partial rear sectional view of a cargo container that comprises a cargo tube and a wheel assembly, where a plurality of triangular structural gaps is in the cargo tube floor.

FIG. 17 is a partial rear sectional view of cargo container that comprises a cargo tube and a wheel assembly, where a plurality of rectangular structural gaps is in the cargo tube floor.

FIG. 18 is a partial rear sectional view of a cargo container that comprises a cargo tube and a wheel assembly, where a plurality of I-beam support structures are in a plurality of structural gaps are in the cargo tube floor.

FIG. 19 is a partial rear sectional view of a cargo container that comprises a cargo tube and a wheel assembly, where a plurality of I-beam and honeycomb support structures are in a plurality of structural gaps are in the cargo tube floor.

FIG. 20 is a partial rear sectional view of a cargo container that comprises a cargo tube and wheel assembly, where a plurality of structural supports is integral to the cargo tube floor;

FIG. 26 is a perspective view of a cargo container that comprises a cargo tube and wheel a assembly, where the cargo tube has support protrusions for the wheel assembly and front supports;

FIG. 27 is a perspective view of a segmented cargo container that comprises a wheel assembly and a plurality of cargo tubes;

FIG. 29 is a perspective view of a cargo container that comprises a cargo tube, a wheel assembly, and a hinged doors connected to the cargo tube;

FIG. 30 is a partial perspective view of a cargo container that comprises a cargo tube, a wheel assembly, and sliding doors connected to the cargo tube;

FIG. 31 is a perspective view of a cargo container that comprises a cargo tube, a wheel assembly, a single sliding rear door, and a side door connected to the cargo tube;

FIG. 32 is a perspective view of a cargo container that comprises a cargo tube, a wheel assembly, and hinged door connected to the cargo tube;

DETAILED DESCRIPTION OF THE INVENTION

Referring to the figures, exemplary embodiments of the invention will now be described. The exemplary embodiments are provided to illustrate aspects of the invention and should not be construed as limiting the scope of the invention. The exemplary embodiments are primarily described with reference to the figures.

Exemplary Cargo Tube Manufacturing Machine

Figure 1:
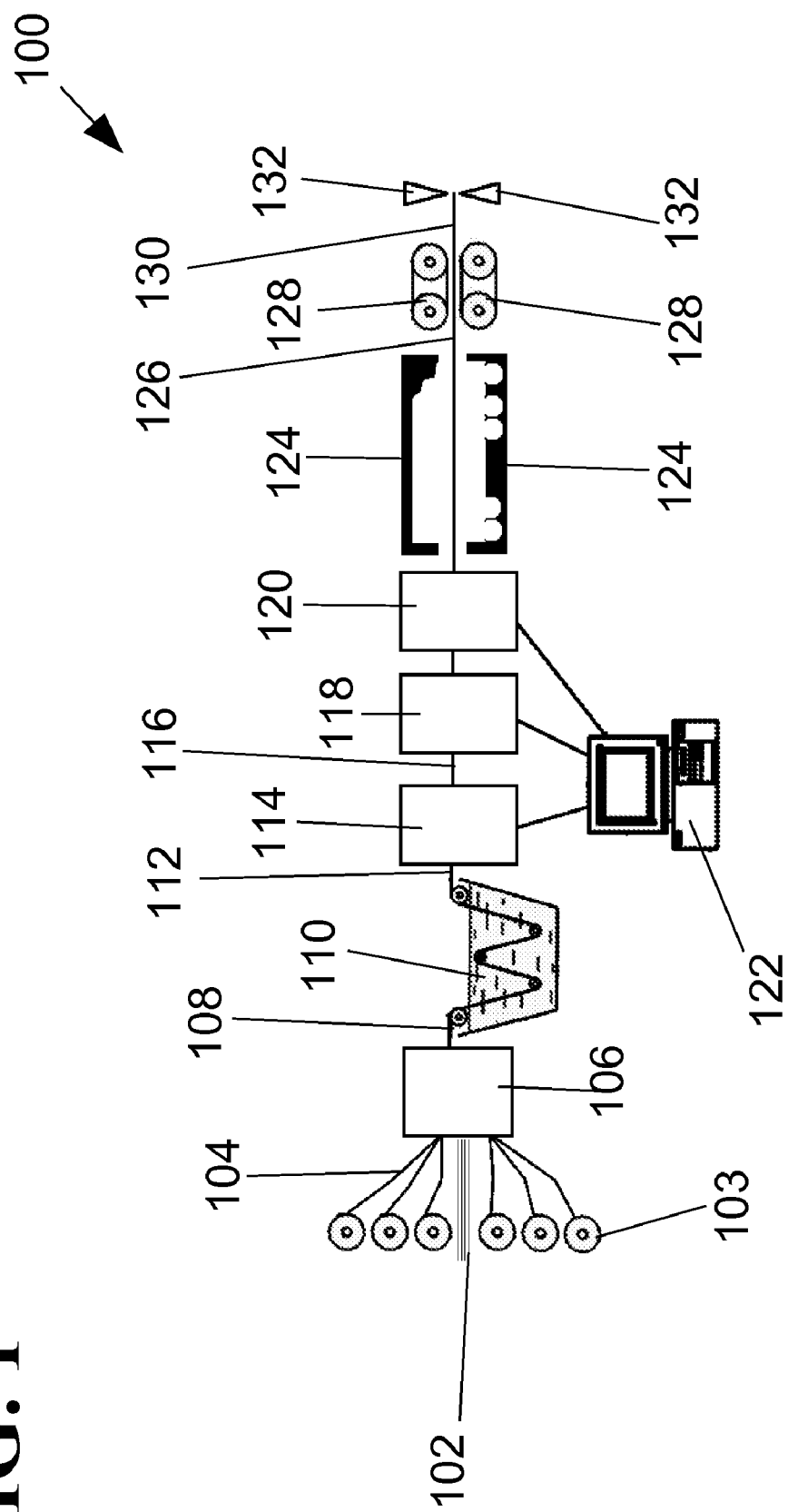

FIG. 1, indicated generally at 100, illustrates an exemplary embodiment of a continuous manufacturing process for pultruding cargo tubes. Optional structural reinforcement material 102, and fiber material 104 drawn from a fibrous material source 103 are fed into a pre-forming device 106 that creates a fiber sheet 108. Resin 110 is then applied to the fiber sheet 108 creating a resin impregnated sheet 112. Computer 122 controlled heated and cooled forming guides 114, 118, and 120, further shape the resin impregnated fiber sheet 116. A final die 124 comprises optional heating and cooling means for further refining the fiber impregnated sheet into a pultruded tube 126. The pultruded tube 126 is drawn through a hydraulic reciprocating pulling means 128, and then cut into cargo tube lengths 130 by a cutting means 132. In one exemplary embodiment of the invention, a cargo tube length would be between 50 and 60 feet (15-18 m). In other embodiments of the invention, a cargo tube length could be significantly more or significantly less. Numerous cargo tubes can be cut from the continuously pultruded tube.

Figure 2:
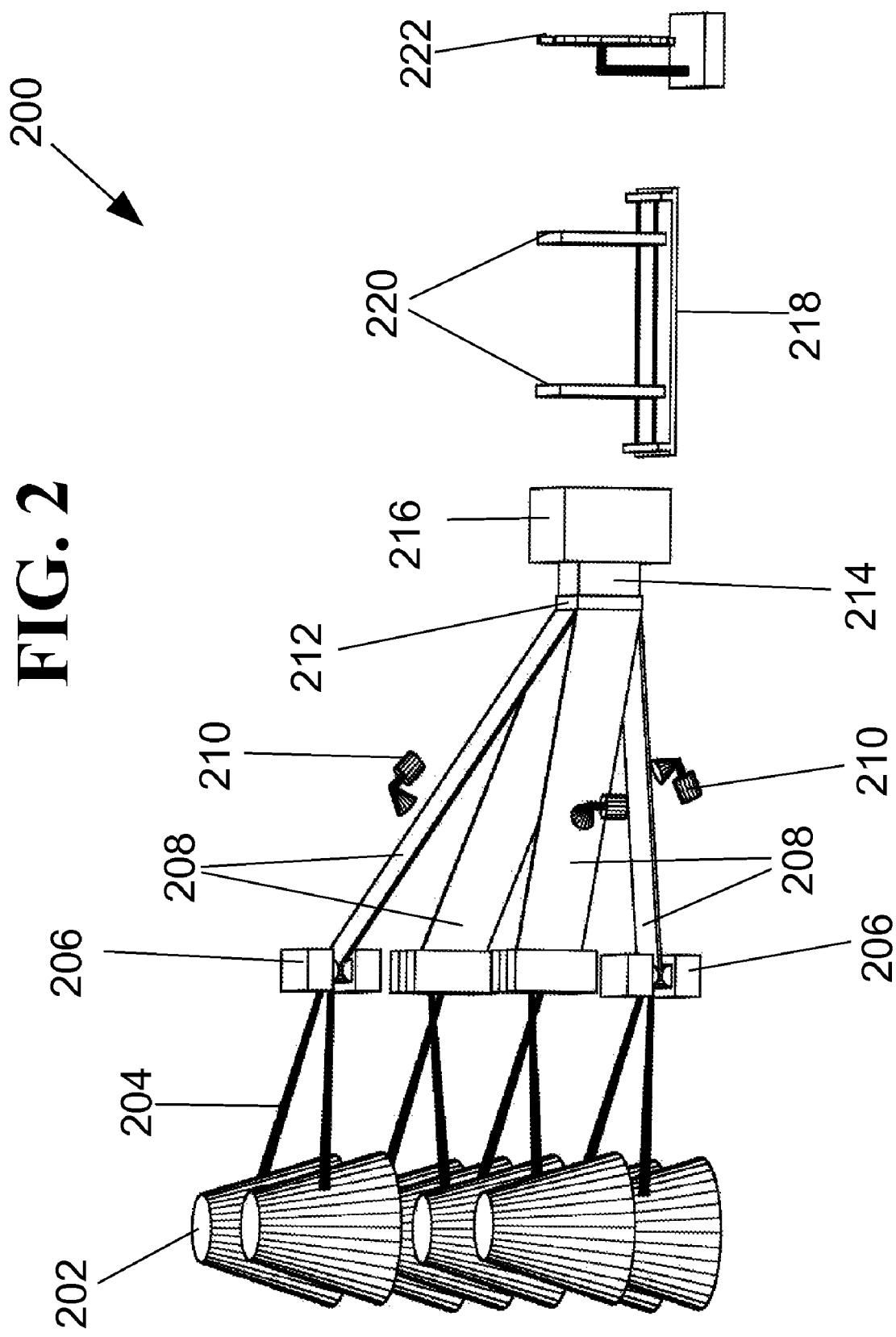

FIG. 2, indicated generally at 200, illustrates a second exemplary embodiment of a continuous manufacturing process for pultruding a cargo tube. Strands 204 from material sources 202 are fed into a plurality of sheet shaping means 206 that creates sheets 208. Resin is impregnated into the sheets by resin applicators 210. The resin impregnated sheets are combined in a tube 214 by a combining means 212. The tube is further shaped by a forming guide 216, pulled through a caterpillar type pulling means 218, shaped by heated and cooled forming dies 220 on the caterpillar type pulling means, and then cut into cargo tube lengths by a cutting means 222.

Figure 3:
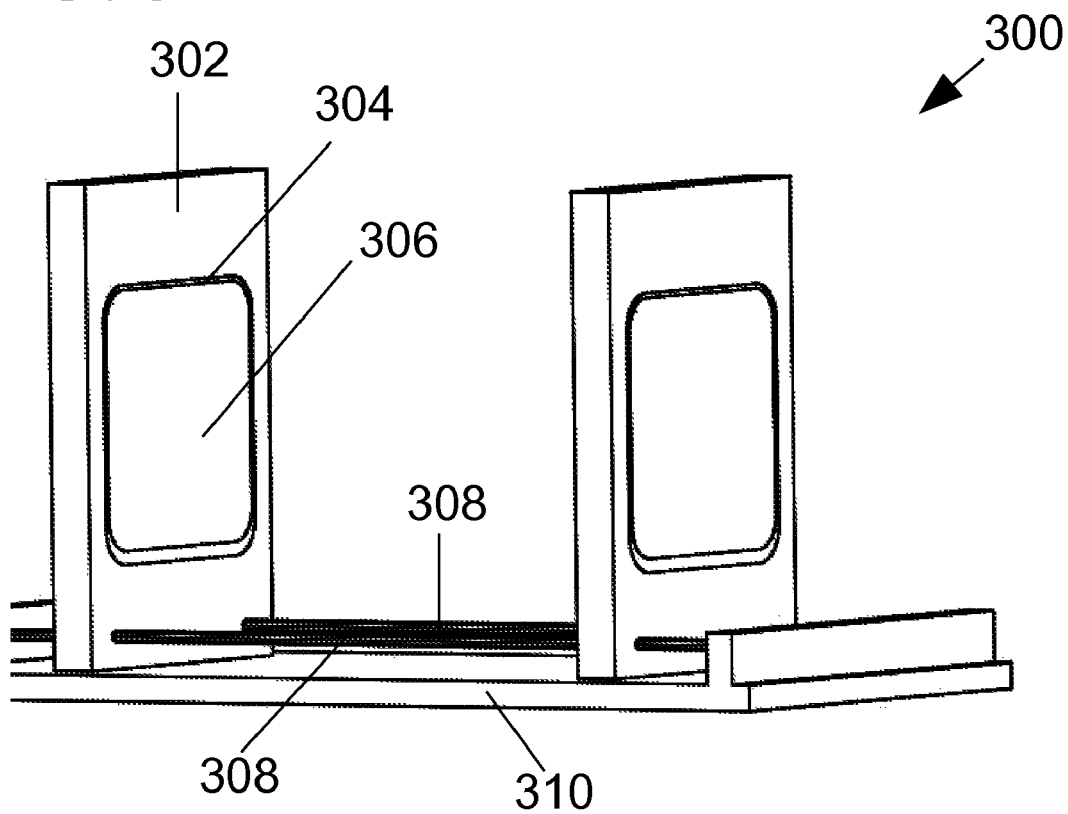
FIG. 3 is a schematic view of caterpillar type puller used in the pultrusion manufacturing.

FIG. 3, indicated generally at 300, illustrates a caterpillar type pulling means where the forming dies comprise an outer die section 302, an inner die section 306, and a gap 304 between the inner and outer dies through which the manufacture is pulled. The forming dies are moved along a track 310 by a set of cables 308 in way that one of the dies is always acting on the manufacture.

Figure 4:
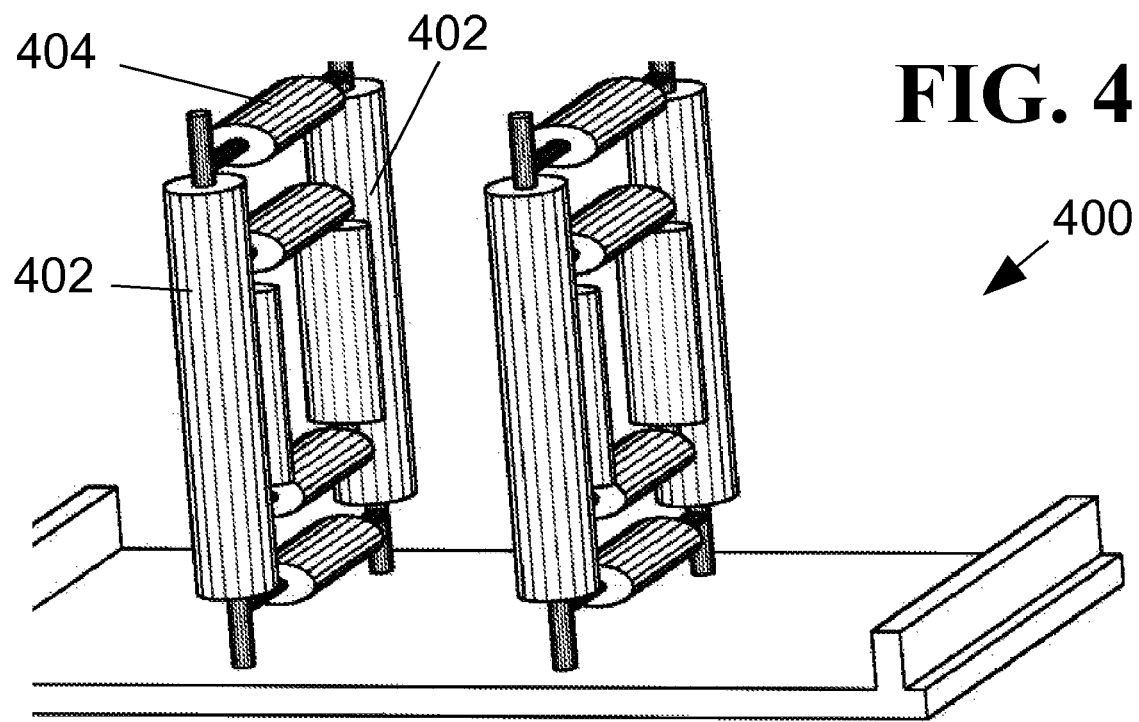
FIG. 4 is a schematic view of hydraulic reciprocating type puller used in the pultrusion manufacturing.

FIG. 4, indicated generally at 400, illustrates a hydraulic reciprocating type puller where a plurality of vertical rollers 402, and horizontal rollers 404, act upon the tube. In one exemplary embodiment of the invention, an pattern is imprinted on the cargo tube by the vertical and/or horizontal rollers.

Exemplary Cargo Tube Method of Manufacture

Figure 5:
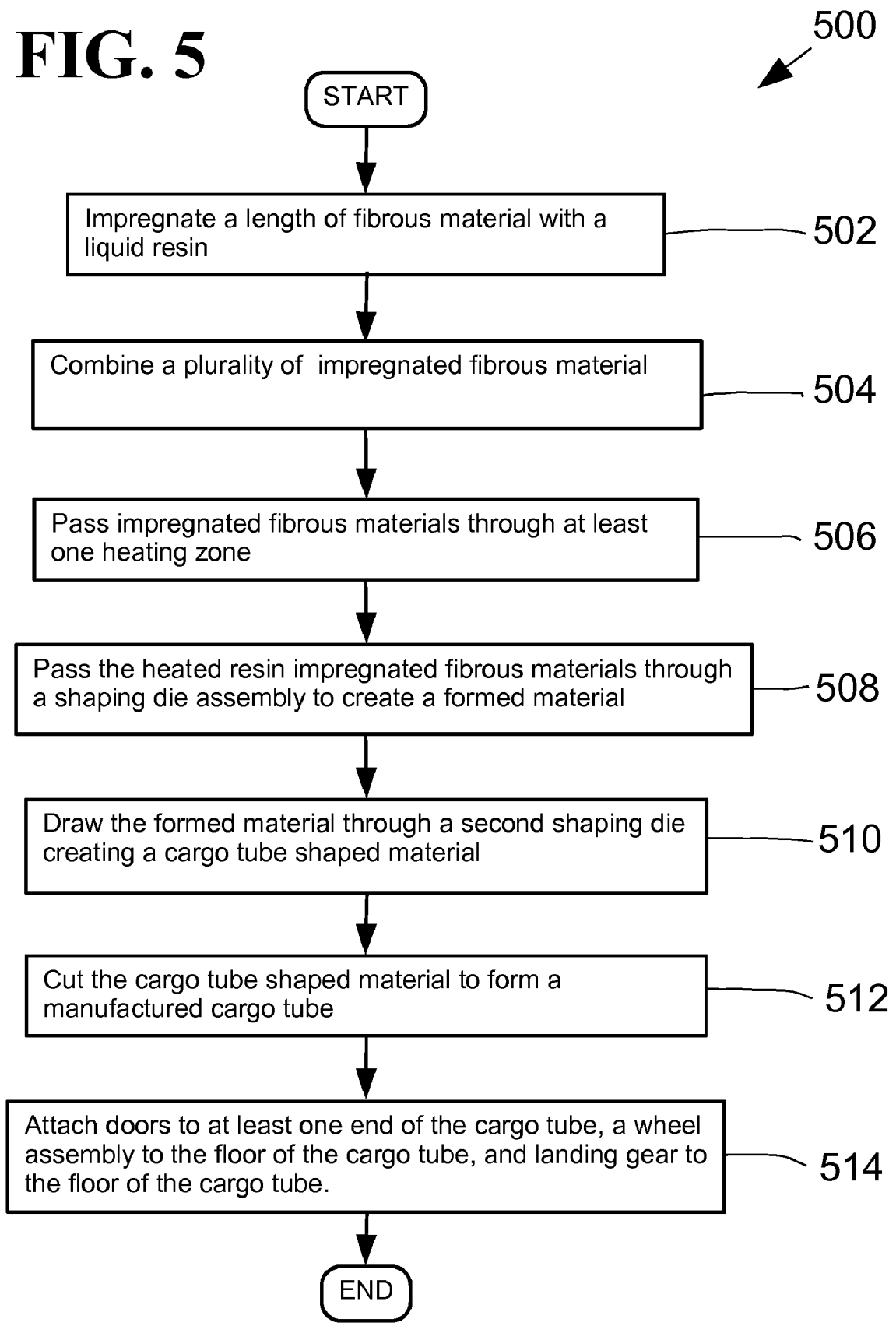
FIG. 5 is a flow diagram illustrating a method for creating a cargo container, where the resin impregnated fibrous material is preheated before shaping.

FIG. 5 is a flow diagram illustrating a Method 500 for creating a truck type trailer cargo container from a pultrusion process. At Step 502 a length of fibrous material 104 is impregnated with a resin 110. At Step 504 the impregnated fibrous material is combined with other impregnated fibrous materials. At Step 506 the resin impregnated fibrous materials 108 are passed through at least one heating zone. At Step 508, the heated resin impregnated fibrous materials are passed through a shaping die assembly to create a formed material. At Step 510, the formed material is drawn through a second shaping die creating a cargo tube shaped material. At Step 512, the cargo tube shaped material is cut to form a manufactured cargo tube. At Step 514, doors are attached to at least one end of the cargo tube, along with a wheel assembly and landing gear. In an exemplary embodiment of the invention, the doors and the cargo tube have substantially the same height. In another embodiment, the cargo tube shaped material is continuously pultruded and numerous cargo tubes are cut from the cargo tube shaped material.

Method 500 is illustrated with an exemplary embodiment. However, the present invention is not limited to such an embodiment and other embodiments can also be used to practice this invention.

In such an exemplary embodiment of Method 500, at step 502 a length of fibrous material 104 is impregnated with a resin 112. Examples of fibrous materials include injected molded glass, fiberglass, nylon, glass material, stamped steel, stamped aluminium, carbon/nylon reinforced textile sheets, amarid, polyester, and carbon fiber.

Examples of resins 112 used in Method 500 include epoxy, unsaturated polyester, urethane acrylate, vinyl ester, phenol, or polyurethane, or a thermoplastic resin, such as nylon 6, nylon 66, nylon 12, PBT, PET, polycarbonate, polyacetal, polyphenylene sulfide, polyether ether ketone, polyether sulfide, polyphenylene oxide, modified polyphenylene oxide, polypropylene, and polyvinyl chloride, ethylene-vinyl acetate copolymer; polystyrene, acrylonitrile-butadiene-styrene copolymers (ABS), 6, 11, 12, 6-6 and 6-10 polyamides, poly(ether amide) sequenced copolymer, fluorinated polymers, polysulfone, polyethersulfone, polycarbonate, polyetheretherketone, polyphenylene sulfur, polyetherimide, and polyphenylene ether.

In such an exemplary embodiment of Method 500, at step 504 resin impregnated fibrous material is combined with other impregnated fibrous materials in a process that may include a passing the resin impregnated material through a die to compress them, thus forcing the molten resin to penetrate between the fibers.

In such an exemplary embodiment of Method 500, at step 506 the resin impregnated fibrous materials 108 are passed through at least one heating zone. Examples of heating zones include a heated tunnel, a heated die, and a heated solution bath. At Step 508, the heated resin impregnated fibrous materials are passed through a shaping die assembly to create a formed material. In one exemplary embodiment of the invention, the shaping die includes a heating means and a cooling means. At Step 510, the formed material is passed through a second shaping die forming a material in the general shape of a cargo tube. At Step 512, the material is cut to form a cargo tube. At Step 514, doors, hinges, a landing gear assembly that supports the front of the container during parking and storage of the container, and a wheel assembly are optionally connected to the cargo tube.

Figure 6:
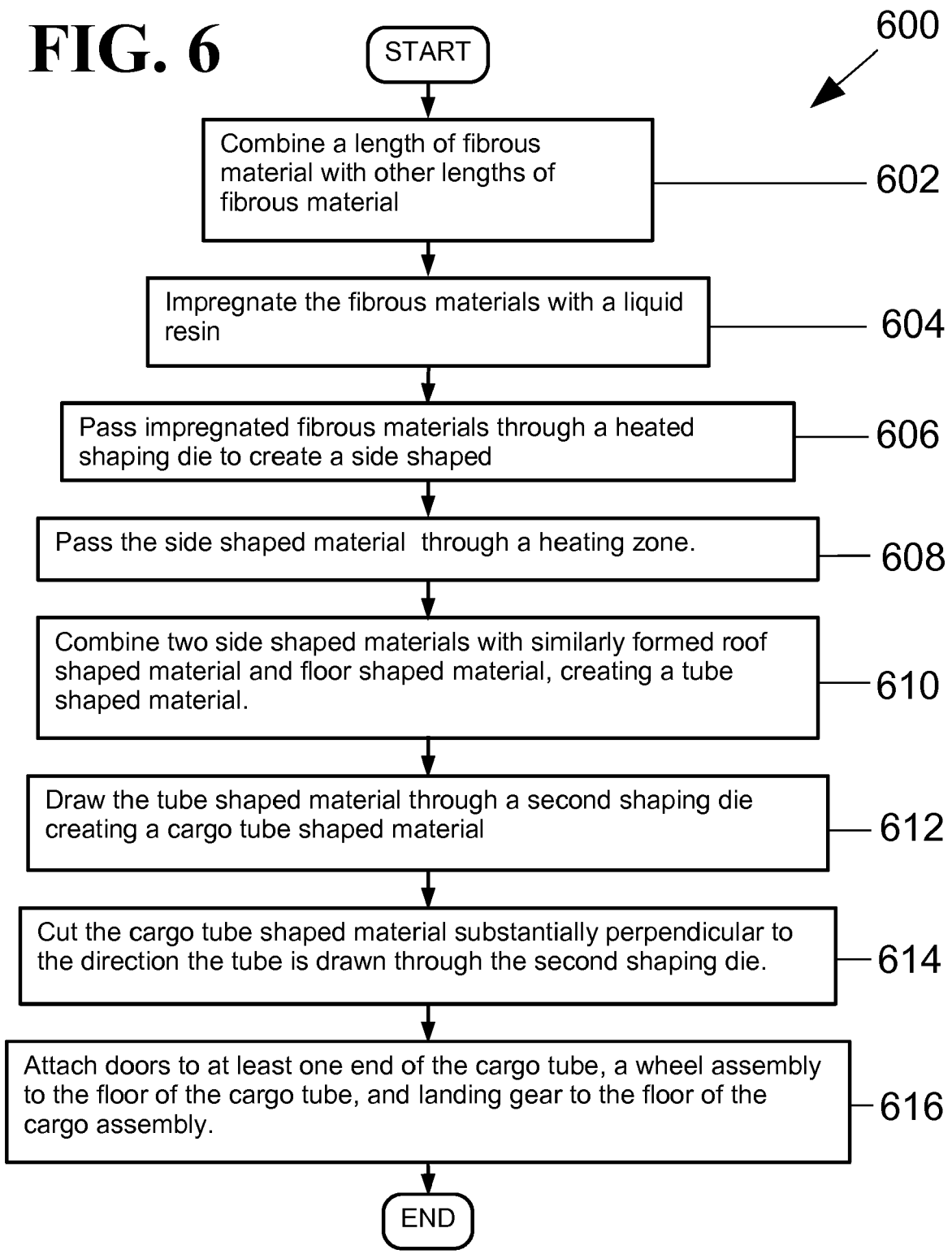
FIG. 6 is a flow diagram illustrating a method for creating a cargo container, where the resin impregnated fibrous material is shaped at its first heating.

In another exemplary embodiment, FIG. 6 illustrates a Method 600 for creating a cargo container. At Step 602, a length of fibrous material is combined with other lengths of fibrous material. At Step 604, the materials are impregnated with a liquid resin. At Step 606, the resin impregnated fibrous materials are passed through a heated shaping die to create a side shaped. At Step 608, the side shaped material is passed through a heating zone. At Step 610, two side shaped materials are combined with similarly formed roof shaped material and floor shaped material, creating a tube shaped material. At Step 612, the tube shaped material is drawn through a second shaping die creating a cargo tube shaped material. At Step 614, the cargo tube shaped material is cut substantially perpendicular to the direction the tube is drawn through the second shaping die. At Step 616, doors are connected to at least one end of the cargo tube, a wheel assembly is connected to the floor of the cargo tube, and landing gear are connected to the floor of the cargo assembly.

Figure 7:
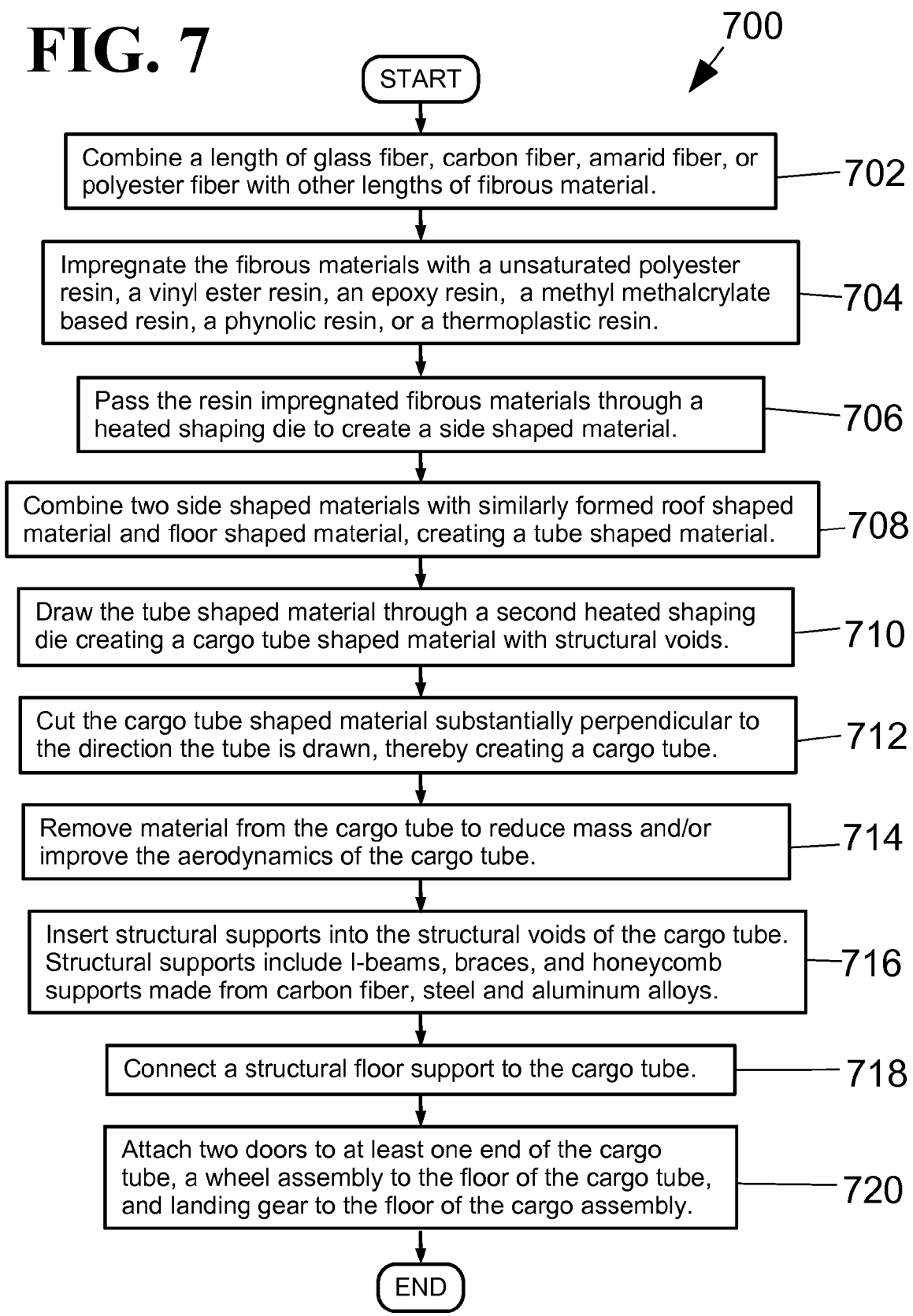
FIG. 7 is a flow diagram illustrating a method for creating a cargo container using exemplary embodiments of fiber, resin, and structural supports.

In another exemplary embodiment, FIG. 7 illustrates a Method 700 for creating a cargo container. At Step 702, a length of glass fiber, carbon fiber, amarid fiber, or polyester fiber is combined with other lengths of fibrous material. At Step 704, the fibrous materials is impregnated with a unsaturated polyester resin, a vinyl ester resin, an epoxy resin, a methyl methalcrylate based resin, a phynolic resin, or a thermoplastic resin. At Step 706, the resin impregnated fibrous materials are passed through a heated shaping die to create a side shaped material. At Step 708, two side shaped materials are combined with similarly formed roof shaped material and floor shaped material, creating a tube shaped material. At Step 710, the tube shaped material is drawn through a second heated shaping die creating a cargo tube shaped material with structural voids. At Step 712, the cargo tube shaped material is cut substantially perpendicular to the direction the tube is drawn, thereby creating a cargo tube. At Step 714, material is removed from the cargo tube to reduce mass and/or improve the aerodynamics of the cargo tube. At Step 716, structural supports are inserted into the structural voids of the cargo tube. Structural supports include I-beams, braces, and honeycomb supports made from carbon fiber, steel and/or aluminum alloys. At Step 718, a structural floor support is connected to the cargo tube. At Step 720, two doors assemblies are connected to at least one end of the cargo tube, a wheel assembly/assemblage is connected to the floor of the cargo tube, and trailer landing gear assembly/assemblage is connected to the floor of the cargo assembly/assemblage.

Figure 8:
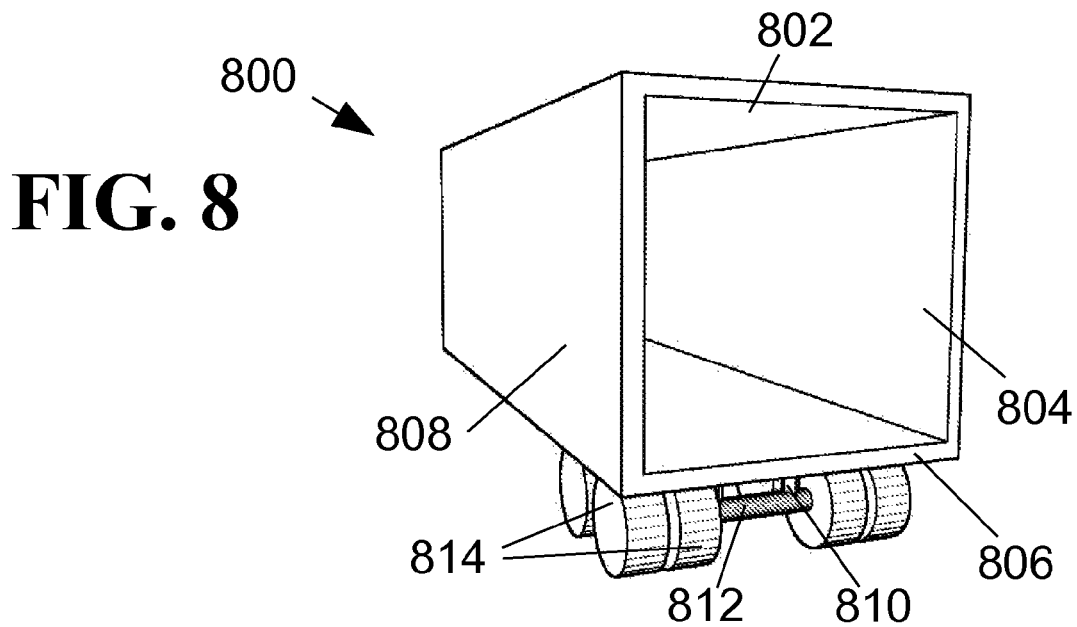
FIG. 8 is a perspective view of a cargo container that comprises a cargo tube and a wheel assembly.

FIG. 8, indicated generally at 800, illustrates a jointless and seamless manufactured cargo tube with a structural network/lattice of pultruded resin forming a roof 802, a first side 804, a second side 808, and a floor 806. In this exemplary embodiment of the invention, the floor of the cargo tube 806 is connected to a strut 810, which is connected to an axel 812, which is connected to a plurality of wheels 814. The strut, axel and wheels comprise a wheel assembly. In one embodiment of the invention, the cargo tube has a length of 43 to 63 feet, a width of 95 to 107 inches, and a height of 100 to 120 inches. In an exemplary embodiment of the invention, the cargo tube has a length of 53 feet, a width of 102 5/16ths inches, and a height of 110 inches. In an exemplary embodiment of the invention, the cargo container comprising the cargo tube and wheel assembly has a height of 13 feet 6 inches, a width of between 98 and 105 inches, and a length of between 43 and 63 feet.

Figure 9:
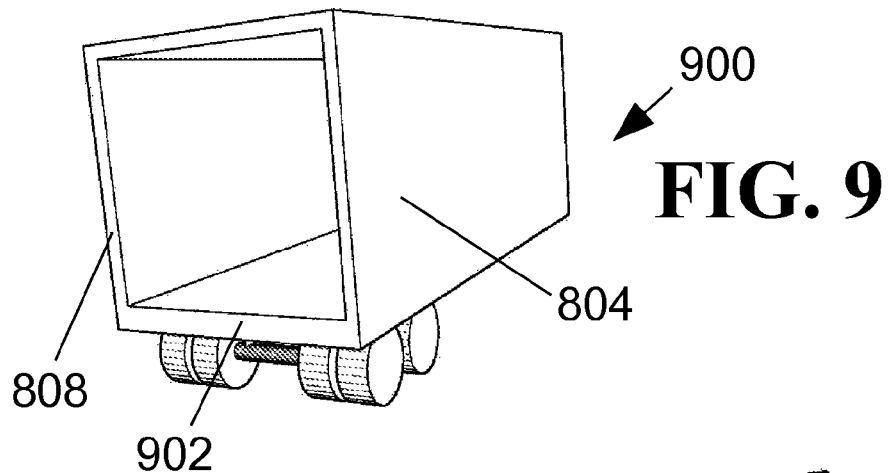
FIG. 9 is a perspective view of a cargo container that comprises a cargo tube and a wheel assembly, where the floor of the cargo tube is thicker than each of the sidewalls.

FIG. 9, indicated generally at 900, illustrates a cargo container comprising a cargo tube and a wheel assembly, where the cargo tube has a first side 804 and a second side 808, and a thick floor 902. In the illustration shown, the structural network of pultruded resin extends between the interior and exterior surfaces of the roof, the interior and exterior surface of the sides, and the interior and exterior surfaces of the cargo tube floor. Additionally, the network of resin extends uninterrupted from the interior floor surface to the exterior roof surface and all of the other surfaces of the tube. The thick floor has a thickness greater than each of the first and second sides.

Figure 10:
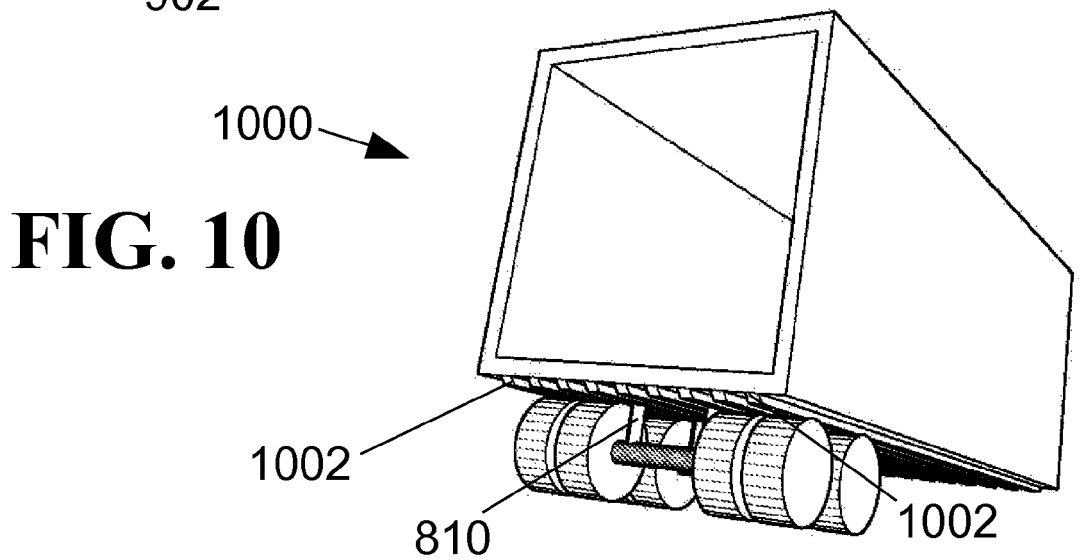
FIG. 10 is a perspective view of a cargo container comprises a cargo tube and a wheel assembly, where the floor of the cargo tube includes lateral protrusions.

FIG. 10, indicated generally at 1000, illustrates a cargo container comprising a cargo tube and a wheel assembly, where the cargo tube includes a plurality of substantially parallel supports 1002 as an integral part of the cargo tube floor. Integral structural supports can be included as part of the cargo tube in the pultrusion process by utilizing a forming die 124 and 220 with the desired cross-section. In addition to structural supports that are integral to the cargo tube, structural supports 2802 can be fastened to the cargo tube 2800.

FIG. 11, indicated generally at 1100 shows cross hatched floor supports 1102 as an integral part of the cargo tube. Cross hatched supports integral to the cargo tube can be formed in part of the pultrusion process by utilizing a variable cross section pultrusion method. In addition to structural supports that are integral to the cargo tube, structural supports 2802 can be fastened to the cargo tube 2800.

FIG. 12, indicated generally at 1200 illustrates a cargo tube with a rounded connections 1202 and 1204 between the roof 802 and second side 808 and first side 804 of the cargo tube, respectively. Rounded connections 1206 and 1208 are also illustrated between the floor of the cargo tube 806 and the first 804 and second side 808, respectively.

Figure 13:
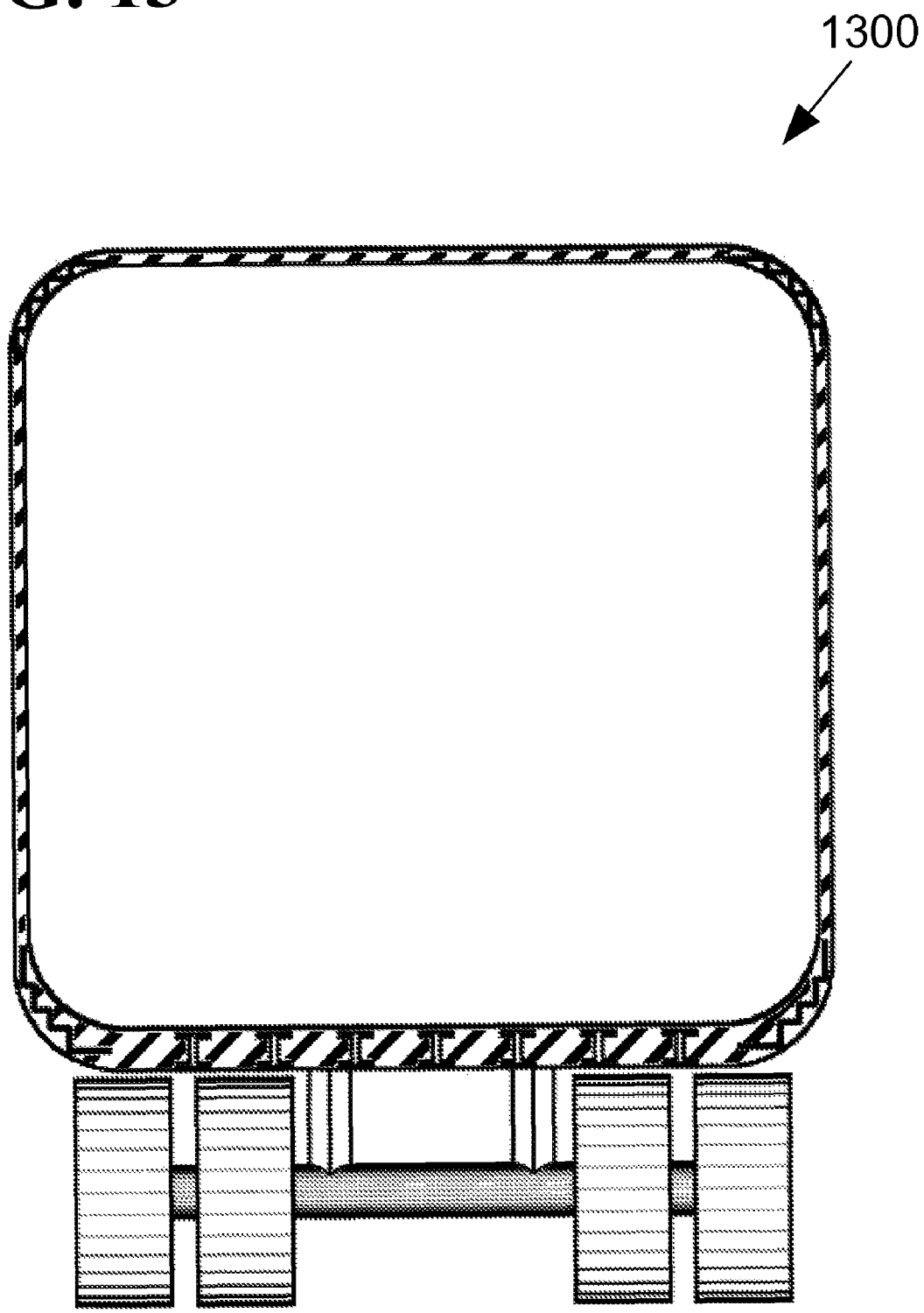
FIG. 13 is a rear sectional view of cargo container that comprises a cargo tube and a wheel assembly.

FIG. 13, indicated generally at 1300 illustrates a full sectional rear view of a cargo tube with structural supports. A plurality of exemplary embodiments is disclosed as partial sectional rear views of the cargo tube in FIGS. 14 through 24.

Figure 14:
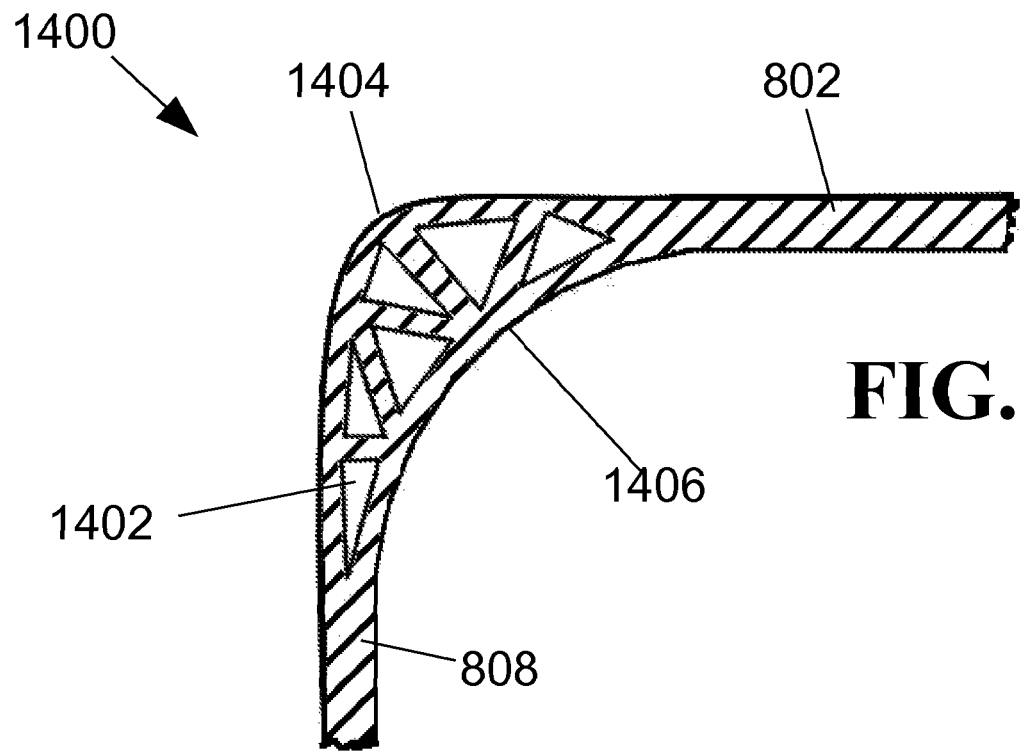
FIG. 14 is a partial rear sectional view of the cargo container, where a plurality of structural gaps are in the transition between the roof and a side of a cargo tube.

FIG. 14, indicated generally at 1400 illustrates a partial sectional rear view of a cargo tube. Weight reducing structural gaps 1402 are included in the pultruded structural network/lattice of the cargo tube between the roof and the sides. The structural gaps may include pitched truss, parallel chord truss, truncated truss, and Vierendeel truss formations. The structural gaps 1402 can be formed during the pultrusion process, added after the pultrusion process by the removal of material, or added after the pultrusion process by the addition of material to the cargo tube. Additionally, the curvature of the outer edge of the cargo 1404, is not the same as the curvature of the inner edge of the cargo tube 1406. Increased cargo tube thickness at the rounded cargo tube connections 1202, 1204, 1206, and 1208 can increase the structural integrity of the cargo tube without an increase in the height and or width of the cargo tube. The structural network/lattice of FIG. 14 extends uninterrupted from the roof 802 to the second side 808. Despite structural gaps, a continuous unbroken path of fiber impregnated resin extends from the roof to the second side.

Figure 15:
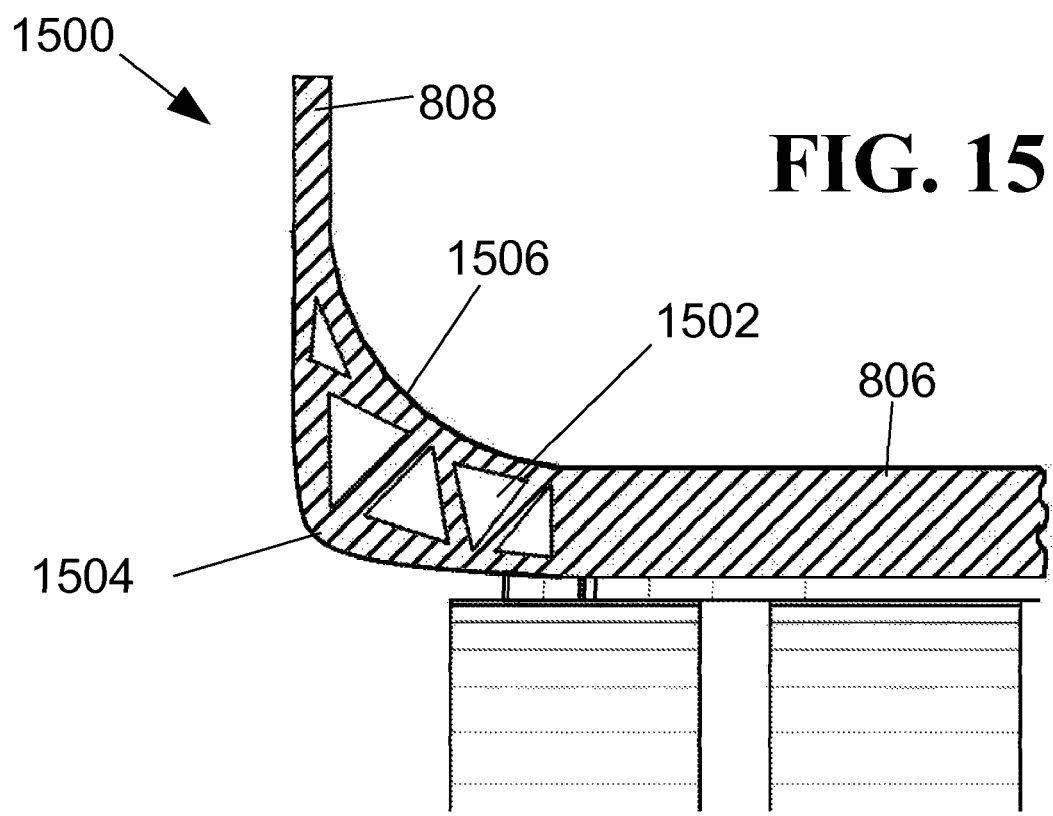
FIG. 15 is a partial rear sectional view of a cargo container that comprises a cargo tube and a wheel assembly, where a plurality of structural gaps are in the floor and transition between the floor and a side of the cargo tube.

FIG. 15, indicated generally at 1500 illustrates a partial sectional rear view of a cargo tube. Weight reducing structural gaps 1502 are included in the cargo tube between the floor and the sides. The structural gaps may include pitched truss, parallel chord truss, truncated truss, and Vierendeel truss formations. The structural gaps 1502 can be formed during the pultrusion process, added after the pultrusion process by the removal of material, or added after the pultrusion process by the addition of material to the cargo tube. Additionally, the curvature of the outer edge of the cargo 1504, is not the same as the curvature of the inner edge of the cargo tube 1506. Increased cargo tube thickness at the rounded cargo tube connections 1202, 1204, 1206, and 1208 can increase the structural integrity of the cargo tube without an increase in the height and or width of the cargo tube.

FIG. 16 through 20, indicated generally at 1600, 1700, 1800, 1900, and 2000 illustrate partial sectional rear views of cargo tube floors. Triangular structural gaps 1602 and square structural gaps 1702, 1804, and 1906 may be included in the cargo tube floor. I-beam structural supports 1804 and 1904 may be in the structural gaps. Honeycomb structural supports 1904 may also be in the structural gaps. Integral floor supports 2002 may also be added to the cargo tube during the cargo tube pultrusion manufacture.

Figure 21:
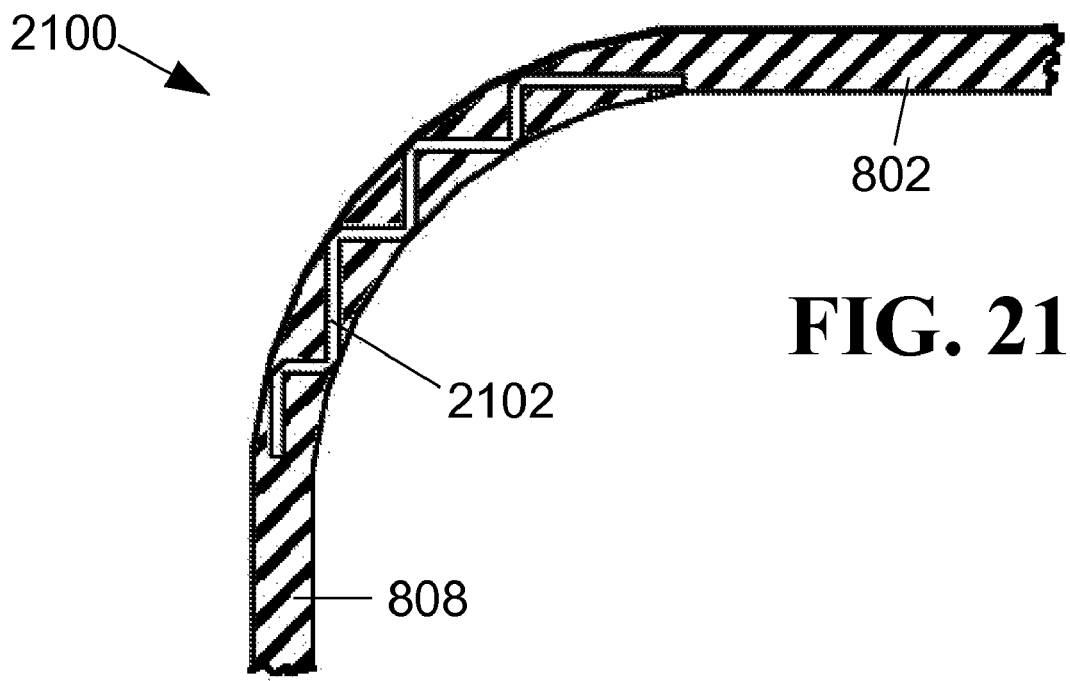
FIG. 21 is a partial rear sectional view of a cargo tube, where a structural support is in the transition between the roof and a side of the cargo tube.

FIG. 21, indicated generally at 2100 illustrates a partial sectional rear view of a cargo tube with structural supports. An integral structural support 2102 is shown supporting the connection between the roof 802 and second side 808 of the cargo tube.

Figure 22:
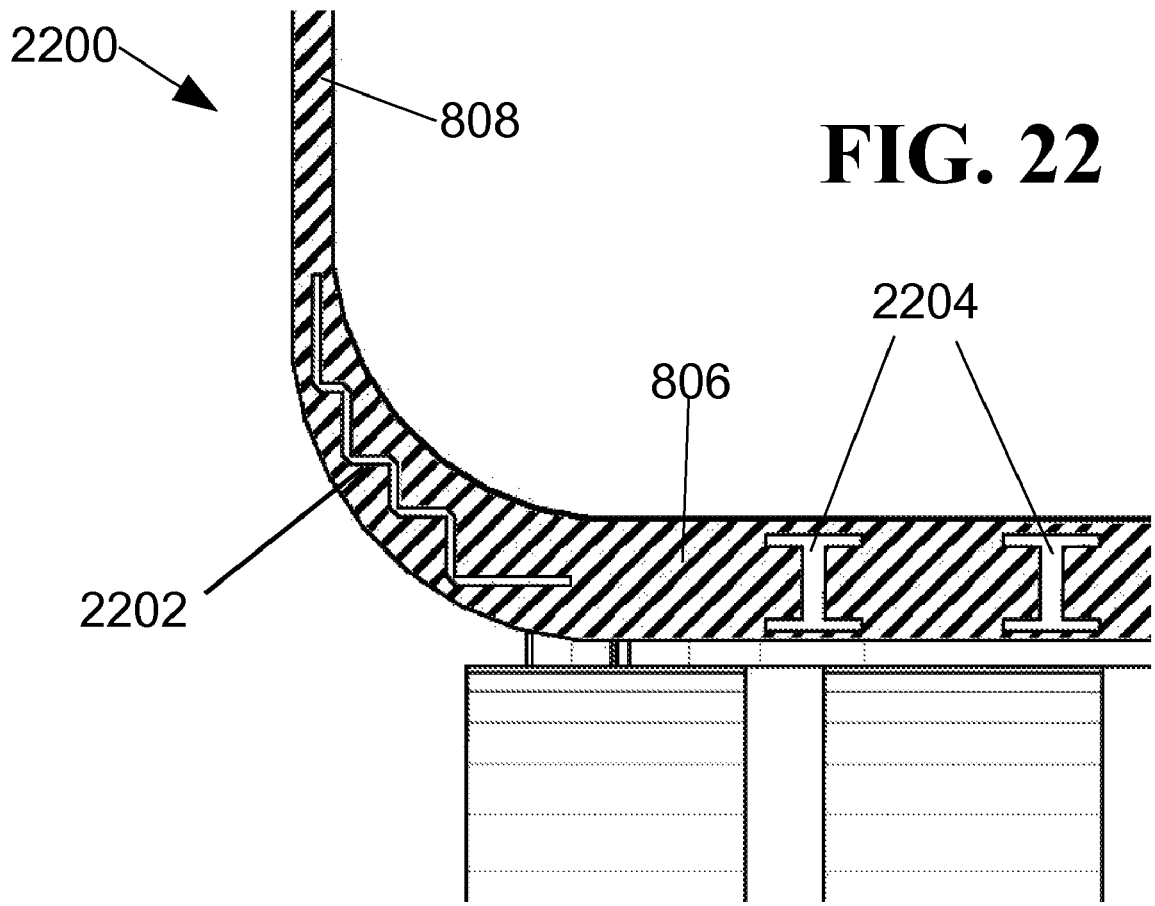
FIG. 22 is a partial rear sectional view of a cargo container that comprises a cargo tube and a wheel assembly, where structural supports are in the cargo tube floor and the transition between the floor and a side of the cargo tube.

FIG. 22, indicated generally at 2200 illustrates a partial sectional rear view of a cargo tube with structural supports. An integral structural support 2202 is shown supporting the connection between the floor 806 and second side 808 of the trailer. I-Beams 2204 within the cargo tube floor 806 are integral the structural integrity of the floor of the cargo tube. The structural network/lattice of FIG. 22 extends uninterrupted from the floor 806 to the second side 808. Despite integral structural supports 2202 and I-Beams 2204, a continuous unbroken path of fiber impregnated resin extends from the floor to the second side.

Figure 23:
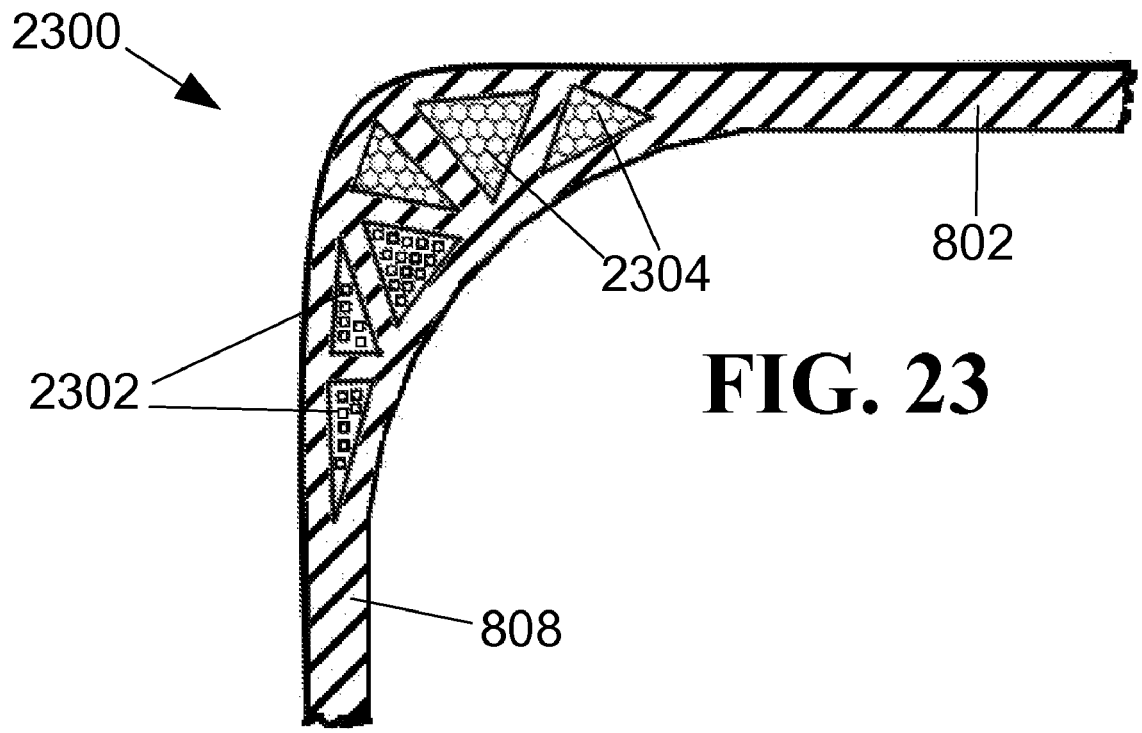
FIG. 23 is a partial rear sectional view of the cargo tube, where a plurality of structural supports is in a plurality of structural gaps in the transition between the roof and a side of the cargo tube.

FIG. 23, indicated generally at 2300 illustrates a partial sectional rear view of a cargo tube. Rod shaped 2302 and honeycomb shaped 2304 support materials are included in the weight reducing structural gaps.

Figure 24:
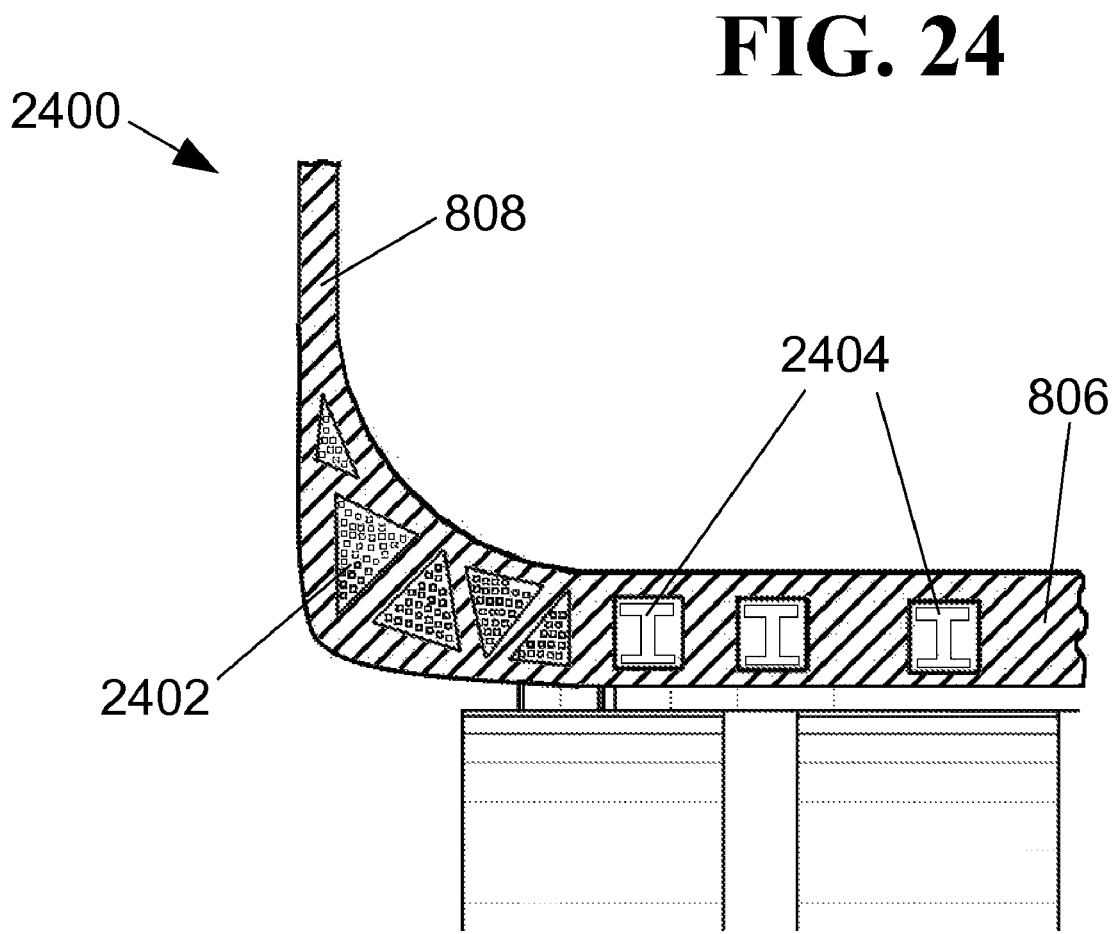
FIG. 24 is a partial rear sectional view of a cargo container that comprises a cargo tube and a wheel assembly, where a plurality of structural supports is in a plurality of structural gaps in the floor and transition between the floor and a side of the cargo tube.

FIG. 24, indicated generally at 2400 illustrates a partial sectional rear view of a cargo tube. Rod shaped 2402 and I-beam shaped 2404 support materials are included in the weight reducing structural gaps.

Figure 25:
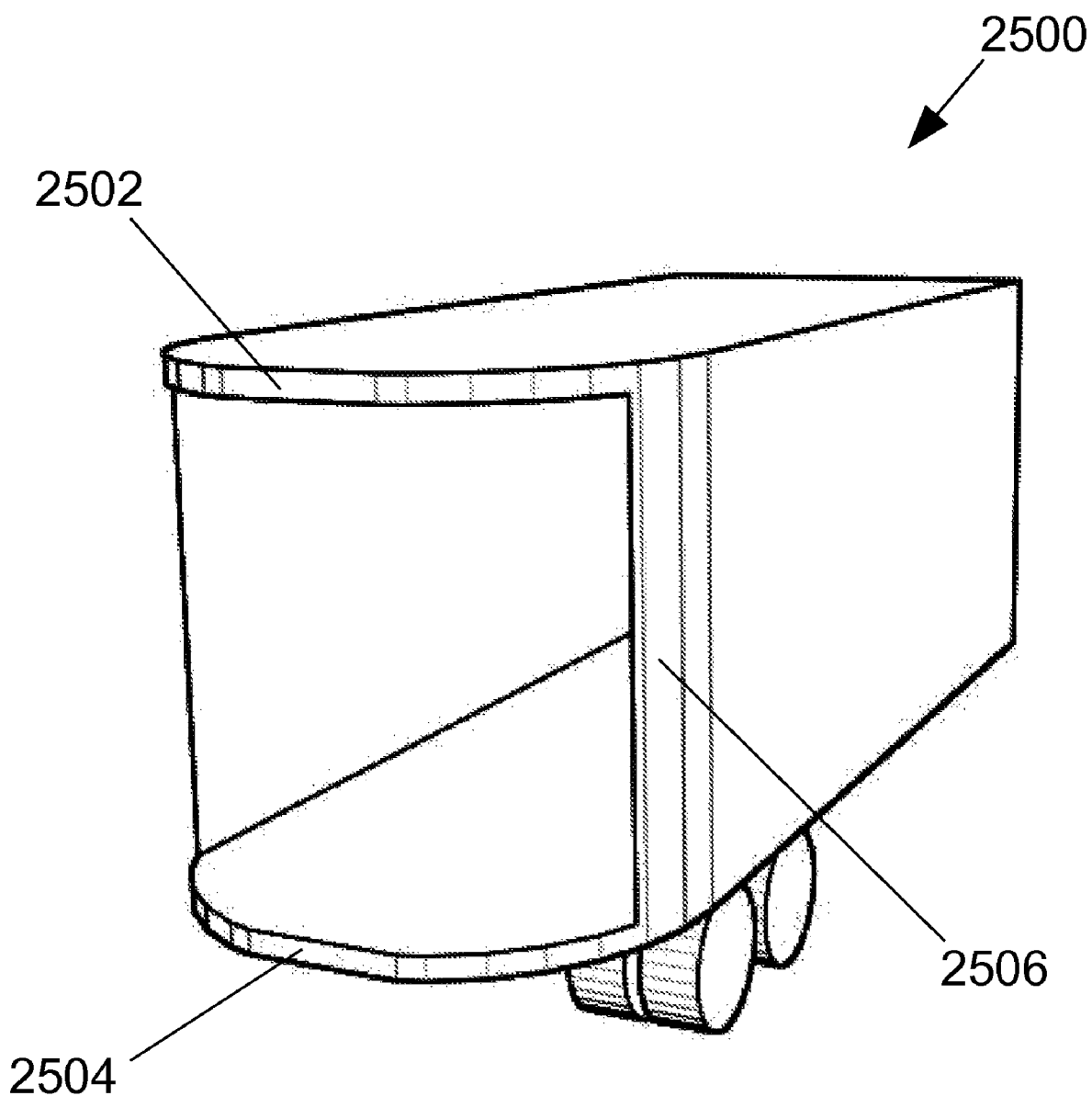
FIG. 25 is a perspective view of a cargo container that comprises a cargo tube and wheel a assembly, where an end of the cargo tube is rounded.

FIG. 25, indicated generally at 2500 illustrates a rear perspective view of a cargo container comprising a cargo tube with an end that includes an aerodynamically rounded roof 2002, an aerodynamically rounded floor 2004, and an aerodynamically rounded side 2006. In another embodiment of the invention, both ends of the cargo tube include an aerodynamically rounded roof, floor, and side.

FIG. 26, indicated generally at 2600 illustrates a bottom perspective view of a cargo container comprising a cargo tube with an increased floor thickness 2602 and 2604 at the connection point of the wheel assembly and landing gear 2606. The regions of increased floor thickness may be created during the pultrusion process by utilizing a variable cross section method, or by fastening additional material to a cargo tube after the pultrusion process.

Figure 28:
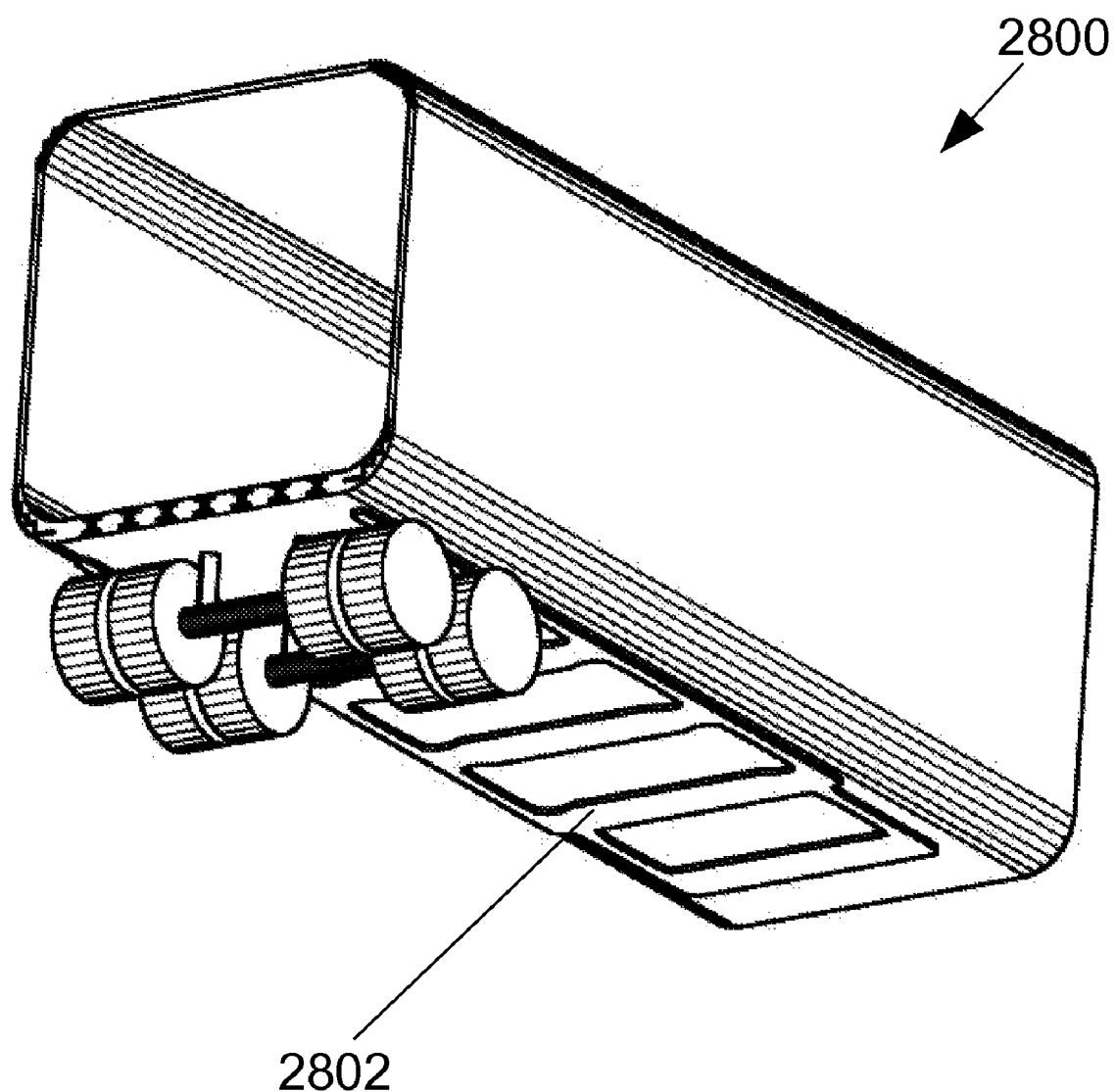
FIG. 28 is a perspective view of a cargo container that comprises a cargo tube, a wheel assembly, and a structural support connected to the cargo tube.

FIG. 27, indicated generally at 2700 illustrates a rear perspective view of a cargo container comprising a rear cargo tube section 2702 that is connected to a connection means 2704 which is further connected to a fore cargo tube section 2706. As illustrated, more than one connection means and fore cargo tube section can be utilized FIG. 28, indicated generally at 2800 illustrates a bottom perspective view of a cargo container with a non-integral structural support 2802 that has been fastened to a cargo tube by an attachment means such as rivets, adhesives, nails, screws, weld, or bolt.

FIG. 29, indicated generally at 2900 illustrates a rear perspective view of a cargo container with at least one door 2902 connected to the cargo tube by at least one hinge 2904.

FIG. 30, indicated generally at 3000 illustrates a partial rear perspective view of a cargo container with two sliding doors 3002 that include handles 3004. The cargo tube may include an integrally formed track on which the sliding doors can operate.

FIG. 31, indicated generally at 3100 illustrates a partial rear perspective view of a cargo container with a single rear sliding door 3102 and a side mounted door 3104 connected to a cargo tube. In another embodiment of the invention, both sides of the cargo container include FIG. 32, indicated generally at 3200 illustrates a rear perspective view of a cargo container with a single door 3202 connected to a cargo tube by at least one hinge 3204.

Figure 33:
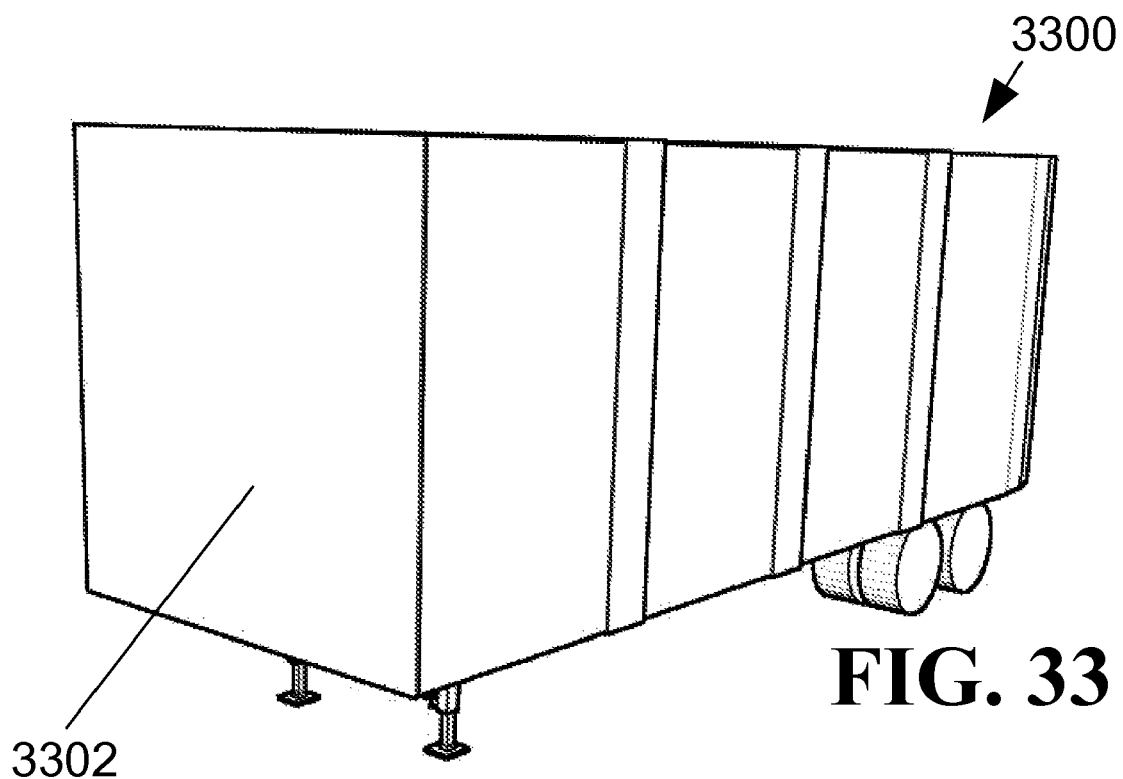
FIG. 33 is a perspective view of a segmented cargo container that comprises a plurality of cargo tubes, a wheel assembly, and a flat front panel.

FIG. 33, indicated generally at 3300 illustrates a rear perspective view of a cargo container with a flat front face 3302 connected to one end of the cargo tube.

Figure 34:
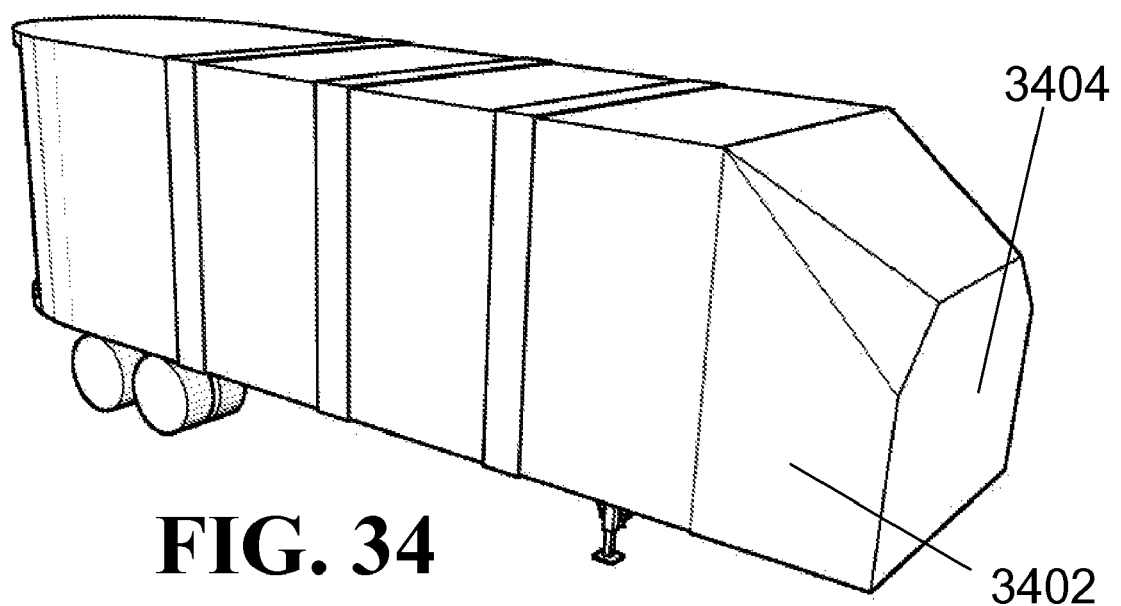
FIG. 34 is a perspective view of a segmented cargo container that comprises a plurality of cargo tubes, a wheel assembly, and an angled front panel.

FIG. 34, indicated generally at 3400 illustrates a rear perspective view of a cargo container with an angled front section 3402 connected to the cargo tube. The angled front section includes a front section face 3404 with a height less than the height of the cargo tube and/or a width less than the width of the cargo tube.

Figure 35:
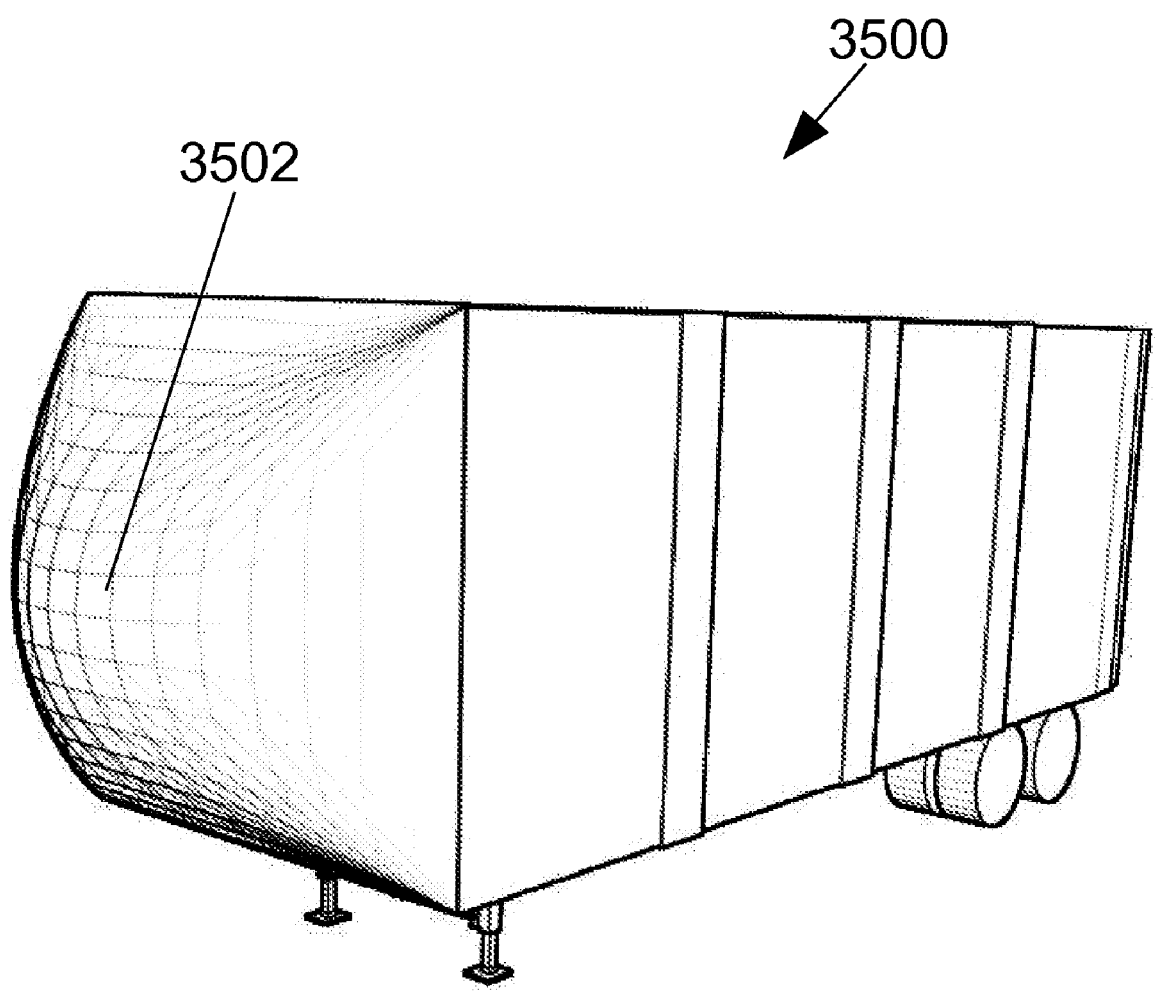
FIG. 35 is a perspective view of a segmented cargo container that comprises a plurality of cargo tubes, a wheel assembly, and a rounded front panel.

FIG. 35, indicated generally at 3500 illustrates a rear perspective view of an embodiment of a cargo container with a rounded front section 3502 connected to the cargo tube.

It should be understood that the programs, processes, methods and system described herein are not related or limited to any particular type components unless indicated otherwise. Various combinations of general purpose, specialized or equivalent components may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more, fewer or equivalent elements may be used in the block diagrams.

I claim:

1. A trailer comprising:
   a cargo container;
   a landing gear assembly connecting to the cargo container;
   a wheel assembly connecting to the cargo container;
   the cargo container including
   a top interior surface connecting to a side interior surface, the side interior surface connecting to a bottom interior surface;
   a top exterior surface connecting to a side exterior surface, the side exterior surface connecting to a bottom exterior surface;
   the cargo container has an interior storage area with a sidewall, a ceiling, and a floor, wherein
   the top interior surface forms an interior portion of the ceiling,
   the side interior surface forms an interior portion of the sidewall, and
   the bottom interior surface forms an interior portion of the floor; and
   a single lattice of resin impregnated fibers extending uninterrupted from the top exterior surface to the side interior surface.

2. The trailer of claim 1 further comprising the lattice of resin impregnated fibers extending uninterrupted from the bottom exterior surface to the side interior surface.

3. The trailer of claim 1 further comprising the lattice of resin impregnated fibers extending uninterrupted from the top exterior surface to the bottom interior surface.

4. The trailer of claim 3 wherein substantially all of the resin impregnated fibers in the single lattice are orientated parallel to each other.

5. The trailer of claim 4 further comprising the lattice of resin impregnated fibers having a structural gap circumscribed by parallelly oriented fibers.

6. The trailer of claim 5 further comprising an I-beam located within the structural gap.

7. The trailer of claim 4 further comprising a door connecting to the cargo container and extending from the top exterior surface to the bottom exterior surface.

8. A trailer comprising:
a cargo container;
a landing gear assembly connecting to the cargo container;
a wheel assembly connecting to the cargo container;
the cargo container including
  a top interior surface connecting to a side interior surface, the side interior surface connecting to a bottom interior surface;
  a top exterior surface connecting to a side exterior surface, the side exterior surface connecting to a bottom exterior surface;
  the cargo container has an interior storage area with a sidewall, a ceiling, and a floor, wherein
  the top interior surface forms a portion of the ceiling,
  the side interior surface forms a portion of the sidewall, and
  the bottom interior surface forms a portion of the floor;
a lattice of resin impregnated fibers extending uninterrupted from the top exterior surface to the top interior surface,
the lattice of resin impregnated fibers extending uninterrupted from the ceiling to the floor, and
  the resin impregnated fibers in the lattice are parallelly oriented.

9. The trailer of claim 8 wherein the top interior surface is between 100 and 120 inches from the bottom interior surface.

10. The trailer of claim 8 wherein the resin impregnated fibers in the lattice have lengths between 50 and 60 feet.

11. The trailer of claim 8 wherein the lattice of resin impregnated fibers includes a resin and a plurality fibers, wherein the resin is selected from a group consisting of epoxy, unsaturated polyester, urethane acrylate, vinyl ester, phenol, or polyurethane, and thermoplastic resin.

12. The trailer of claim 8 wherein the lattice of resin impregnated fibers includes a resin and a plurality fibers, wherein the fibers are constructed from a material selected from a group consisting of molded glass, fiberglass, nylon, stamped steel, stamped aluminum, carbon/nylon reinforced textile sheets, amarid, polyester, and carbon fiber.

13. The trailer of claim 8 wherein the landing gear assembly is secured to the lattice of resin impregnated fibers.

14. The trailer of claim 8 further comprising the top interior surface separated from the top exterior surface by a first distance, the bottom interior surface separated from the bottom exterior surface by a second distance, wherein
  the second distance is greater than the first distance.

15. The trailer of claim 8 further comprising the lattice of resin impregnated fibers having a plurality of structural gaps, each of the plurality of structural gaps enclosing a structural support selected from a group consisting of I-beams, braces, and honeycomb supports.

16. The trailer of claim 8 further comprising the cargo container including a plurality of parallel I-beams between the bottom interior surface and the bottom exterior surface.

17. The trailer of claim 8 further comprising the lattice of resin impregnated fibers having a structural gap.

18. The trailer of claim 17 further comprising an I-beam located within the structural gap.

19. The trailer of claim 8 further comprising a door connecting to the cargo container and extending from the top exterior surface to the bottom exterior surface.

20. A trailer comprising:
a cargo container;
a landing gear assembly secured to the cargo container;
a wheel assembly secured to the cargo container;
the cargo container including
  an interior storage area with a sidewall, a ceiling, and a floor, and
  a single lattice of resin impregnated fibers extending uninterrupted from the ceiling to the floor, wherein the resin impregnated fibers in the lattice are parallelly oriented.

* * * * *